(12) United States Patent
Yoshida

(10) Patent No.: US 10,423,050 B2
(45) Date of Patent: Sep. 24, 2019

(54) ILLUMINATION APPARATUS CAPABLE OF MAKING DETERMINATION ON RADIATING DIRECTION OF FLASH AND CONTROL METHOD THEREFOR

(71) Applicant: CANON KABUSHIKI KAISHA, Tokyo (JP)

(72) Inventor: Nobukazu Yoshida, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/964,327

(22) Filed: Apr. 27, 2018

(65) Prior Publication Data
US 2018/0314137 A1 Nov. 1, 2018

(30) Foreign Application Priority Data

May 1, 2017 (JP) ................. 2017-091127
Feb. 14, 2018 (JP) ................. 2018-024240

(51) Int. Cl.
| | |
|---|---|
| *G03B 15/03* | (2006.01) |
| *G03B 17/18* | (2006.01) |
| *G03B 15/05* | (2006.01) |
| *G03B 7/091* | (2006.01) |
| *G03B 7/16* | (2014.01) |
| *G03B 7/0805* | (2014.01) |

(52) U.S. Cl.
CPC ............ *G03B 15/03* (2013.01); *G03B 15/05* (2013.01); *G03B 17/18* (2013.01); *G03B 7/0805* (2013.01); *G03B 7/091* (2013.01); *G03B 7/16* (2013.01); *G03B 2215/0521* (2013.01)

(58) Field of Classification Search
CPC ........................................ G03B 17/18
USPC ........................................ 396/166
See application file for complete search history.

(56) References Cited

U.S. PATENT DOCUMENTS

| | | | | |
|---|---|---|---|---|
| 4,005,444 A | * | 1/1977 | Uchiyama | G03B 7/16 396/159 |
| 2011/0123183 A1 | * | 5/2011 | Adelsberger | G03B 15/03 396/164 |
| 2018/0314137 A1 | * | 11/2018 | Yoshida | G03B 17/18 |

FOREIGN PATENT DOCUMENTS

| | | | | |
|---|---|---|---|---|
| JP | 2002303920 | * | 10/2002 | ............ G02B 7/02 |
| JP | 2002303920 A | | 10/2002 | |

* cited by examiner

*Primary Examiner* — Clayton E. LaBalle
*Assistant Examiner* — Kevin C Butler
(74) *Attorney, Agent, or Firm* — Rossi, Kimms & McDowell LLP

(57) ABSTRACT

An illumination apparatus which is capable of appropriately determining whether or not a radiating direction of a flash is deviated from a direction targeted by a user and preventing degradation in user convenience. The illumination apparatus has a movable unit that has a light-emitting unit, and a main body unit that holds the movable unit rotatably in a predetermined direction. A present angle of the movable unit with respect to the main body unit is detected, and a difference between the present angle and a target angle to which the movable unit is to be moved is obtained. When the difference is smaller than a threshold value, it is determined that there is no angular deviation of the movable unit. The threshold value used in the determination varies with the target angle.

14 Claims, 15 Drawing Sheets

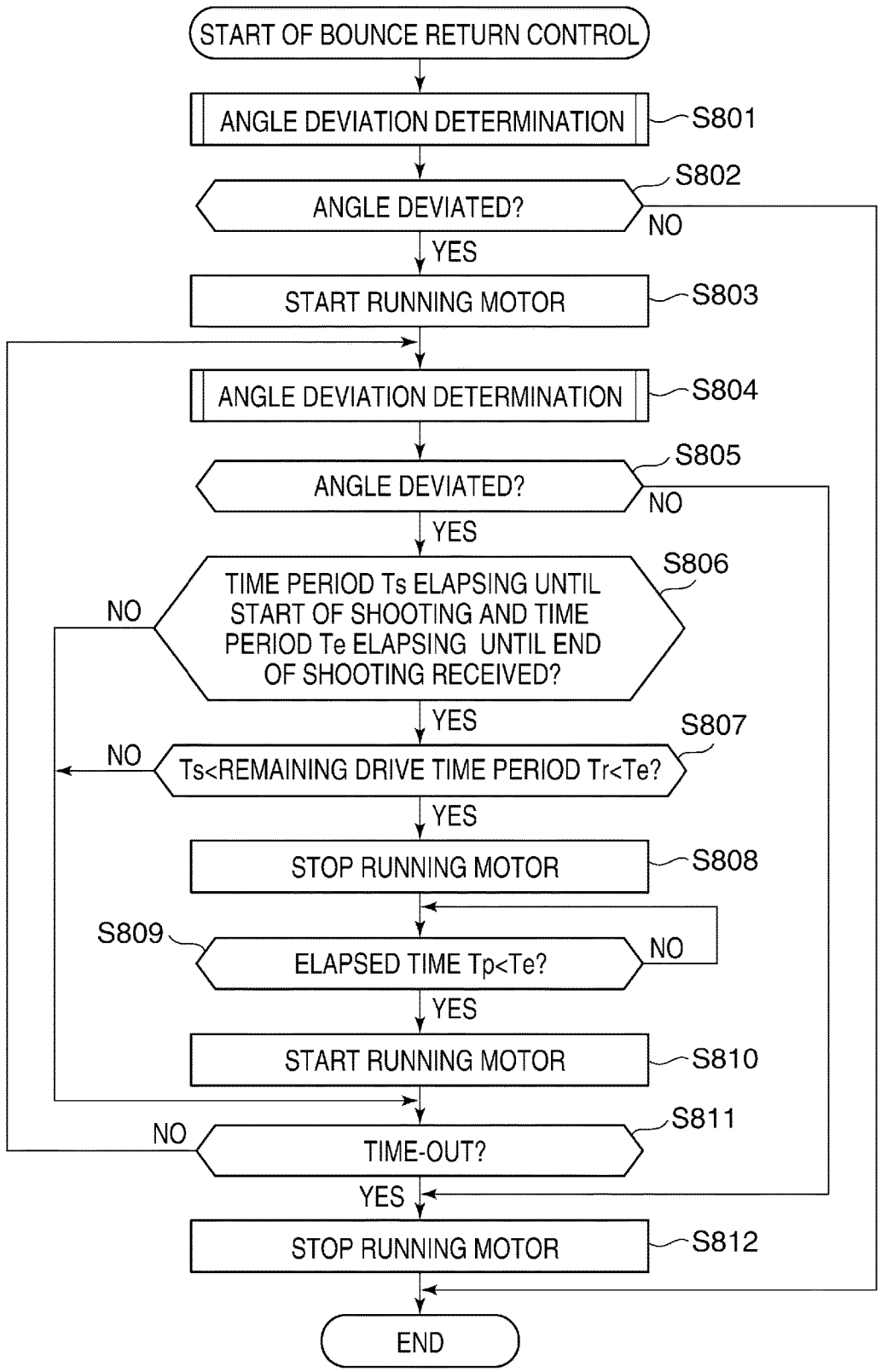

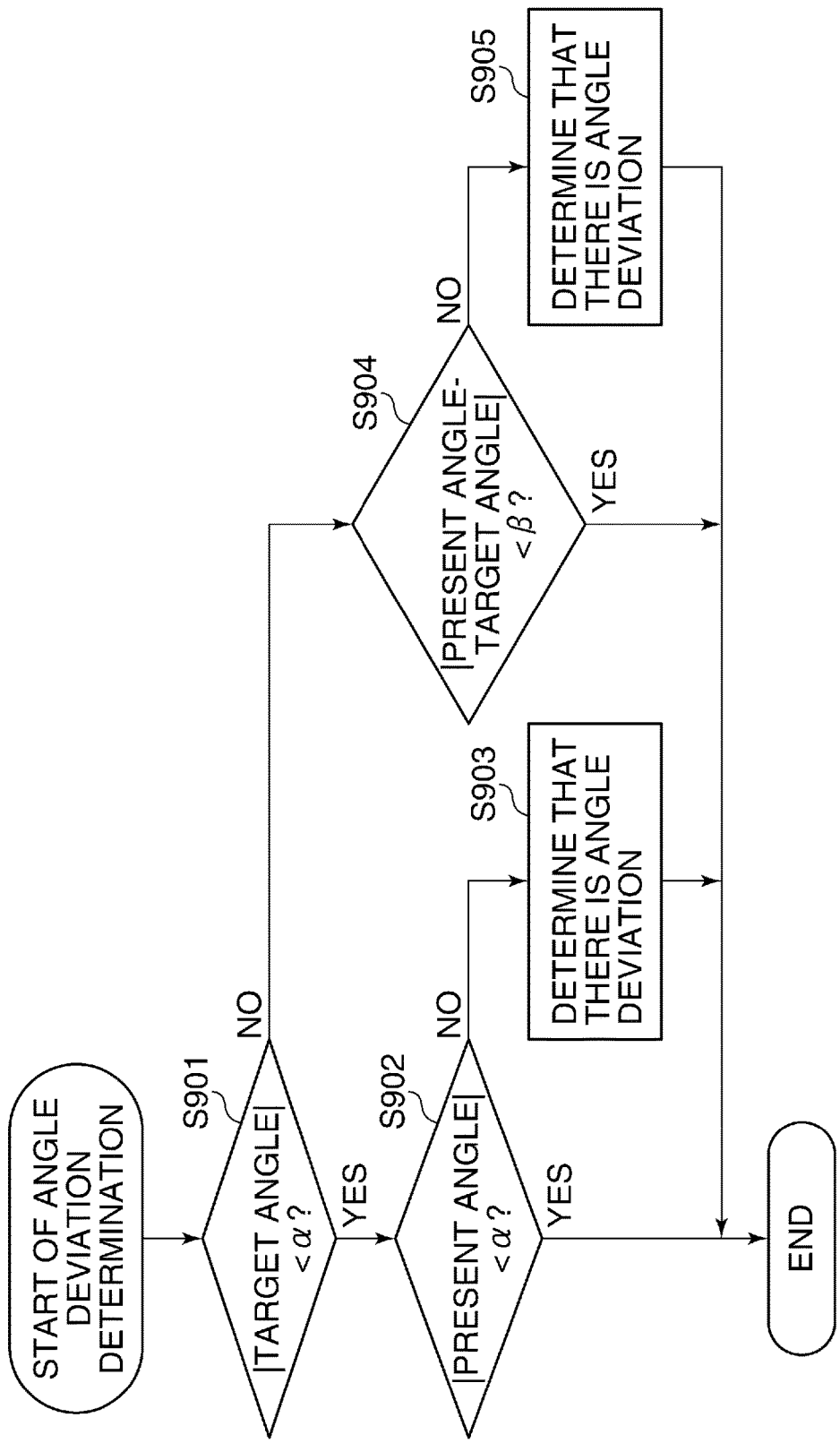

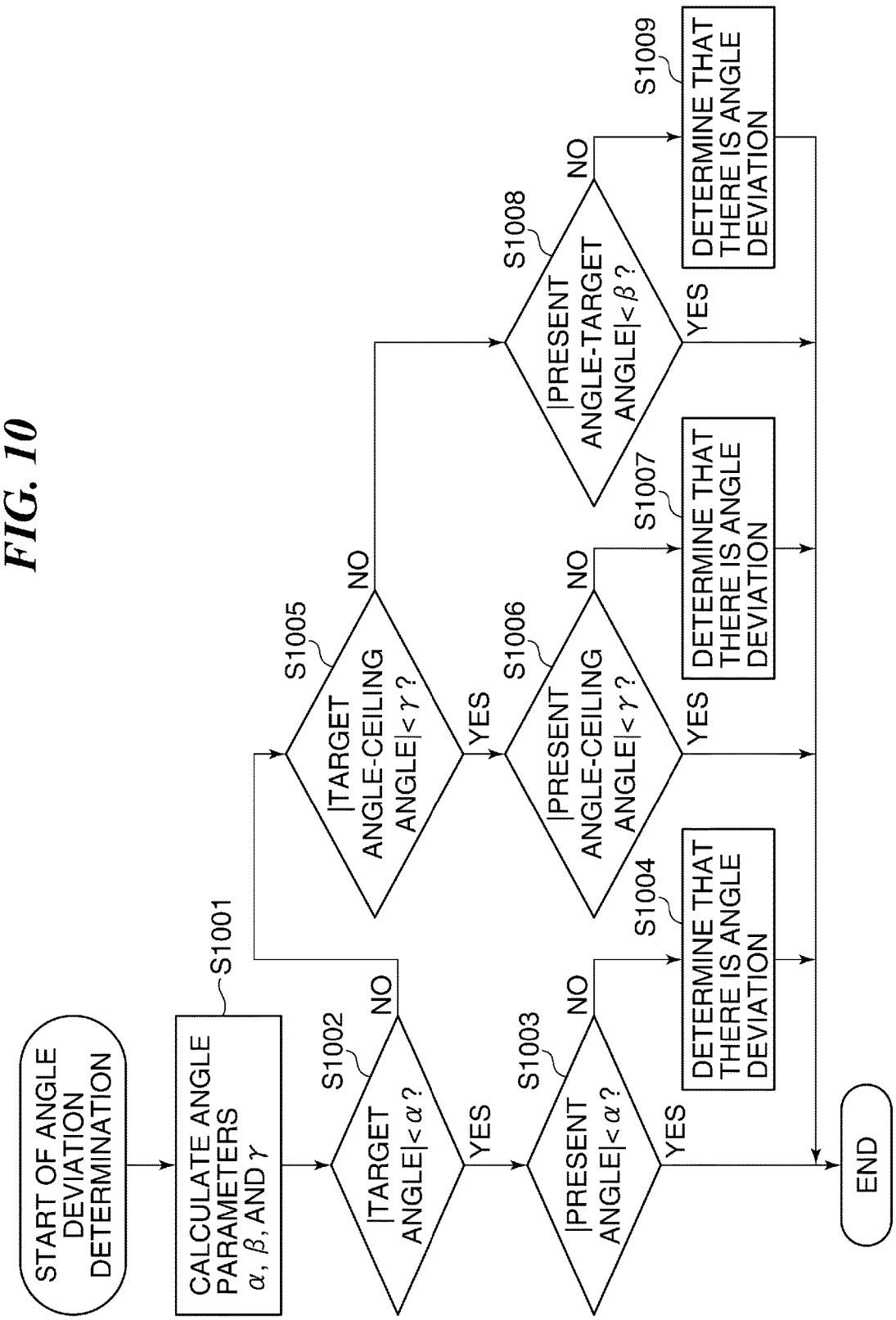

ILLUMINATION APPARATUS CAPABLE OF MAKING DETERMINATION ON RADIATING DIRECTION OF FLASH AND CONTROL METHOD THEREFOR

BACKGROUND OF THE INVENTION

Field of the Invention

The present invention relates to an illumination apparatus and a control method therefor.

Description of the Related Art

One of shooting techniques using an image pickup apparatus is what is called shooting with bounce flash which radiates a flash (illumination light) from a flash unit (illumination unit) toward a ceiling or the like, radiates reflected light diffused from the ceiling or the like toward a subject, and takes a shot. There have been proposed flash units which give a warning when a radiation range of a flash is changed in shooting with bounce flash so that a subject can be appropriately radiated with diffused light. For example, Japanese Laid-Open Patent Publication (Kokai) No. 2002-303920 describes a flash unit which calculates a radiation range of a flash based on an orientation of a light-emitting unit, determines whether or not a subject lies outside the radiation range based on a focal length of a taking lens, and gives a warning according to a result of the determination.

Keeping a subject within a radiation range of a flash is important from the viewpoint of a guide number and preventing deviation of distributed light. For example, when a picture of a subject is taken by directly radiating the subject with a flash, a radiation angle of a flash determined for the subject is required to be highly accurate. On the other hand, depending shooting environments, there may be cases where it is not easy to keep the light-emitting unit at a predetermined angle and cases where a radiating direction of a flash is not required to be highly accurate as distinct from direct radiation in the shooting with bounce flash. In a situation where a radiating direction of a flash is not required to be highly accurate, if a warning is issued even when a radiating direction of a flash is only slightly deviated from a target direction, the warning would be frequently issued, leading to degradation in user convenience.

SUMMARY OF THE INVENTION

The present invention provides an illumination apparatus and a control method therefor which are capable of appropriately determining whether or not a radiating direction of a flash is deviated from a direction targeted by a user and preventing degradation in user convenience.

Accordingly, the present invention provides an illumination apparatus including a first body that has a light-emitter, and a second body that holds the first body rotatably in a predetermined direction, comprising at least one processor; according to programs stored in a memory, the at least one processor functions as a detecting unit configured to detect an angle of the first body with respect to the second body; and a determination unit configured to obtain a difference between a present angle of the first body with respect to the second body, which is detected by the detecting unit, and a target angle to which the first body is to be moved, and based on whether the difference is smaller than a threshold value, determine whether there is an angular deviation of the first body, wherein the threshold value used in the determination varies with the target angle.

According to the present invention, whether or not a radiating direction of a flash is deviated from a direction targeted by a user is appropriately determined while degradation in user convenience is prevented.

Further features of the present invention will become apparent from the following description of exemplary embodiments (with reference to the attached drawings).

BRIEF DESCRIPTION OF THE DRAWINGS

FIG. 8 is a flowchart showing bounce return control in the external flash.

FIG. 9 is a flowchart showing a first example of an angular deviation determination process by the external flash.

FIG. 10 is a flowchart showing a second example of the angular deviation determination process.

DESCRIPTION OF THE EMBODIMENTS

Figure 1:
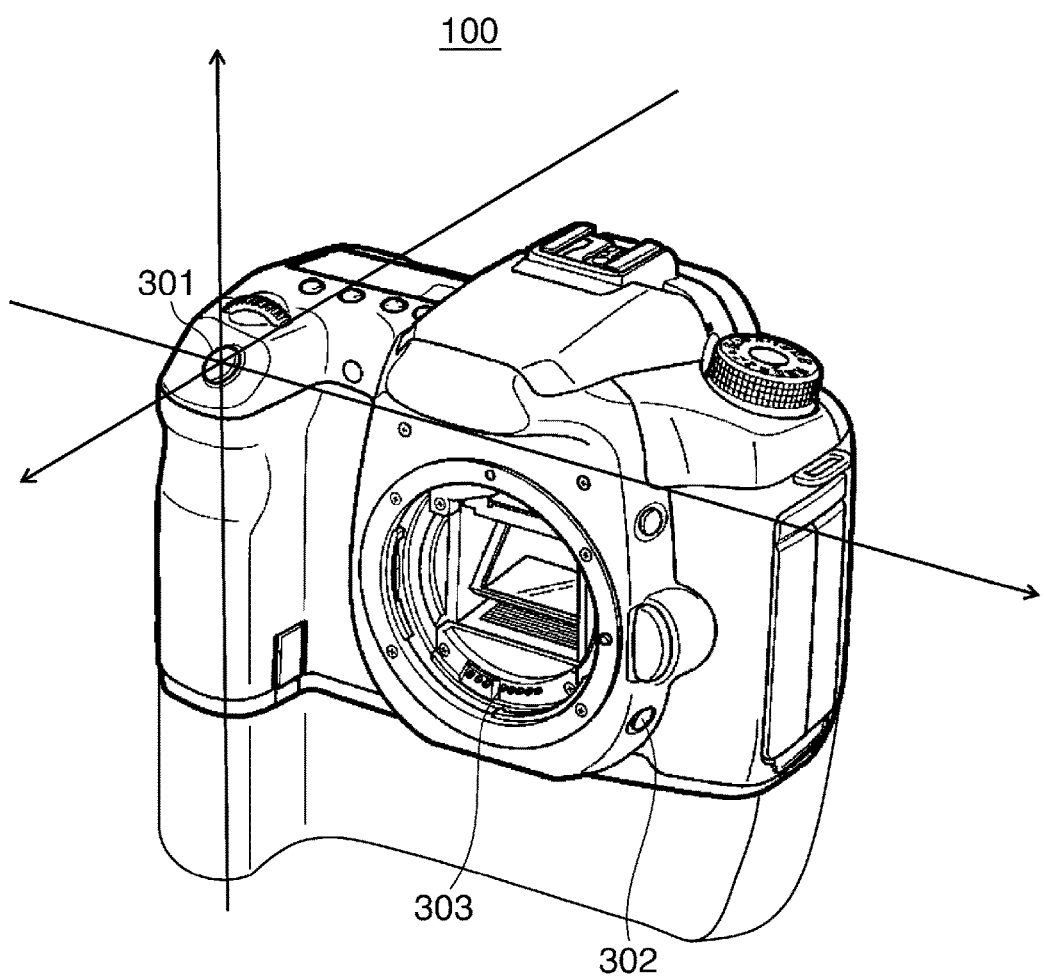
FIG. 1 is a perspective view showing an appearance of an image pickup apparatus constituting an image pickup system according to an embodiment of the present invention.

An embodiment of the present invention will now be described in detail with reference to the accompanying drawings. In the following description of the present embodiment, an image pickup system including an image pickup apparatus which is equipped with an external flash (illumination apparatus) is taken up. FIG. 1 is a perspective view showing an appearance of the image pickup apparatus 100 according to the embodiment of the present invention. A mount 303 for mounting and demounting a lens barrel (interchangeable lens), not shown, is provided on a front side of the image pickup apparatus 100. The image pickup apparatus 100 has a shutter release button 301 and a stop-down start button 302, which are included in a camera operating unit 117, to be described later. It should be noted that the shutter release button 301 and the stop-down start button 302 will be described in detail later.

Figure 2:
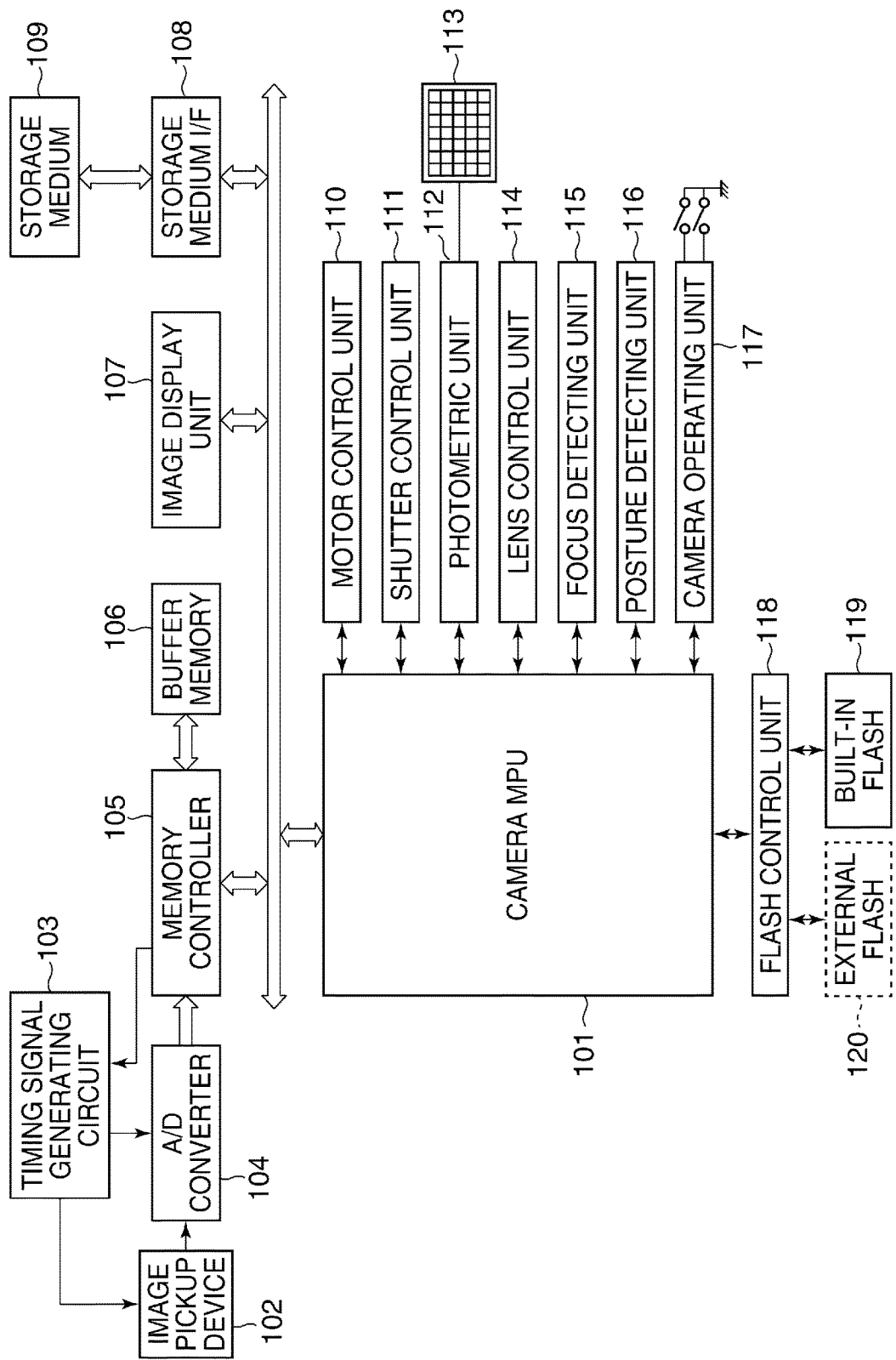
FIG. 2 is a block diagram schematically showing an arrangement of the image pickup apparatus.

FIG. 2 is a block diagram schematically showing an arrangement of the image pickup apparatus 100. The image pickup apparatus 100 has a camera MPU 101, an image pickup device 102, the lens barrel, not shown, a timing signal generating circuit 103, an A/D converter 104, a memory controller 105, a buffer memory 106, an image display unit 107, and a storage medium I/F 108. The image pickup apparatus 100 also has a storage medium 109, a motor control unit 110, a shutter control unit 111, a photometric unit 112, a photometric sensor 113, a lens control unit 114, a focus detecting unit 115, a posture detecting unit 116, a camera operating unit 117, a flash control unit 118, and a built-in flash 119. An external flash device 120 (hereafter referred to as "the external flash 120") is removable from the image pickup apparatus 100.

The image pickup apparatus 100 is, for example, a digital single-lens reflex camera from which the external flash 120 is removable. The camera MPU 101 is a microcontroller (microcomputer) that controls the overall operation of the image pickup apparatus 100. The image pickup device 102 is, for example, a CCD sensor, a CMOS sensor, or the like. Light from a subject passes through the lens barrel and forms an image on the image pickup device 102. The image pickup device 102 converts the formed optical image into an electric signal to generate an analog electric signal. The timing signal generating circuit 103 generates timing signals required to operate the image pickup device 102. The A/D converter 104 converts the analog electric signal output from the image pickup device 102 into image data comprised of a digital signal. It should be noted that in the present embodiment, the camera MPU 101 also acts as an image processing unit for subjecting image data output from the A/D converter 104 to predetermined image processing such as white balance processing.

The memory controller 105 controls reading and writing, refreshing actions, and so forth of a buffer memory 106. The buffer memory 106 temporarily stores image data output from the A/D converter 104 and image data read from the storage medium 109. The image display unit 107 displays image data stored in the buffer memory 106. The storage medium I/F 108 is an interface that enables communication between the storage medium 109 such as a memory card or a hard disk and the camera MPU 101. The motor control unit 101 flips a mirror, not shown, up and down and charges a shutter, not shown, by controlling a motor, not shown, in accordance with signals from the camera MPU 101. The shutter control unit 111 controls and runs a shutter front curtain and a shutter rear curtain, not shown, which are placed in front of the image pickup device 102 in accordance with signals from the camera MPU 101 to control exposure of the image pickup device 102 to light.

The photometric unit 112 outputs photometric values, which are photometric results for respective split areas of a shooting screen, to the camera MPU 101 based on outputs from the photometric sensor 113 which performs photometry in each of the areas. The photometric sensor 113 is a CCD sensor, a CMOS sensor, or the like. It should be noted that based on the photometric results for the respective split areas obtained by the photometric sensor 113, the camera MPU 101 performs exposure computations so as to decide exposure control values for use in shooting (AV (aperture value), TV (shutter speed), and ISO (sensitivity to light, etc.). Also, based on photometric values output from the photometric unit 112 when the built-in flash 119 or the external flash 120 fires a pre flash (preliminarily flash firing) at the subject, the camera MPU 101 computes an output level of a main flash fired by the built-in flash 119 or the external flash 120 during flash shooting (exposure).

The lens control unit 114, which is provided inside the lens barrel, adjust focus and aperture of the lens by controlling a lens drive motor and a diaphragm drive motor, both of which are not shown, in accordance with signals from the camera MPU 101. Based on outputs from a focus detecting sensor, not shown, having a plurality of distance measurement points, the focus detecting unit 115 outputs amounts of defocus at the respective distance measurement points to the camera MPU 101. Based on the amounts of defocus output from the focus detecting unit 115, the camera MPU 101 provides an instruction for the lens control unit 114 to perform a focus adjusting operation. The posture detecting unit 116 has an acceleration sensor or the like and detects a posture of the image pickup apparatus 110 with respect to a direction of gravity and a direction of rotation about a shooting optical axis.

The camera operating unit 117 instructs the camera MPU 101 to perform a variety of processes in response to operation by a user. The camera operating unit 117 includes the shutter release button 301 which receives instructions to start a preparatory operation for shooting and start a shooting operation. The shutter release button 301 is a two-stage switch. A shutter release switch SW1 is turned on by pressing the shutter release button 301 halfway down (first stroke), and in response to this, a preparatory operation for shooting such as a focus detecting operation or a photometric operation is started under the control of the camera MPU 101. It should be noted that an ON signal from the first switch SW1 is sent to a flash MPU 201, to be described later, of the external flash 120 via the flash control unit 118 when the external flash 120 supports auto bounce. Upon receiving the ON signal from the first switch SW1, the flash MPU 201 drives a movable unit 122, to be described later, of the external flash 120 to a set angle. A shutter release switch SW2 is turned on by pressing the shutter release button 301 all the way down (second stroke), and in response to this, a shooting operation is started under the control of the camera MPU 101.

The camera operating unit 117 includes the stop-down start button 302. When the stop-down start button 302 is turned on in a case where the external flash 120 does not support auto bounce, a signal is sent to the lens control unit 114 to adjust an aperture of the lens as mentioned above. On the other hand, when the stop-down start button 302 is turned on in a case where the external flash 120 supports auto bounce, an ON signal is sent to the external flash 120 via the flash control unit 118. Upon receiving the ON signal from the stop-down start button 302, the flash MPU 201 drives the movable unit 122 of the external flash 120 to an optimal angle. An arrangement of the movable unit 122 will be described later.

When the built-in flash 119 or the external flash 120 is used, the flash control unit 118 controls flash patterns or the amount of light to be emitted in pre flash, a main flash, and the like in accordance with signals from the camera MPU 101. The flash control unit 118 also provides control to selectively use the built-in flash 119 or the external flash 120 in accordance with signals from the camera MPU 101. Communications between the flash MPU 201 of the external flash 120 and the camera MPU 101 of the image pickup apparatus 100 are carried out by way of the flash control unit 118.

Figure 3:
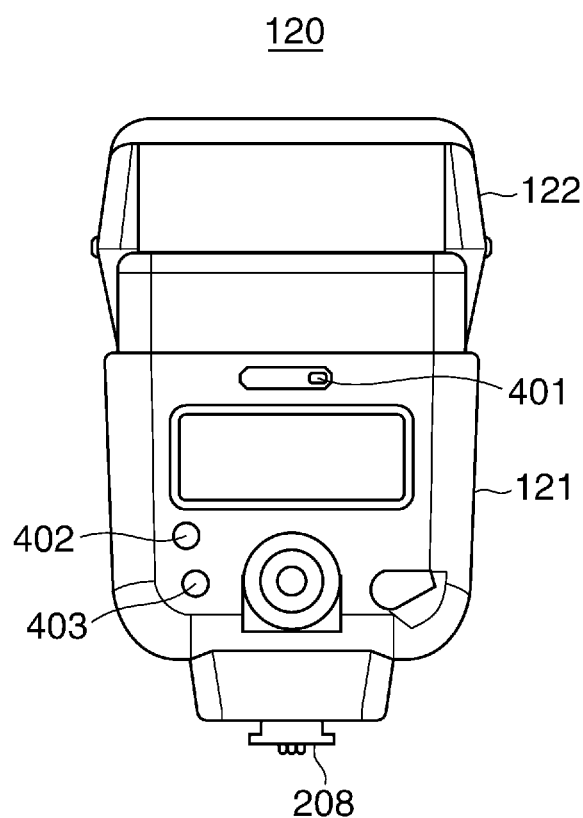
FIG. 3 is a rear view showing an external flash constituting the image pickup system.
Figure 4:
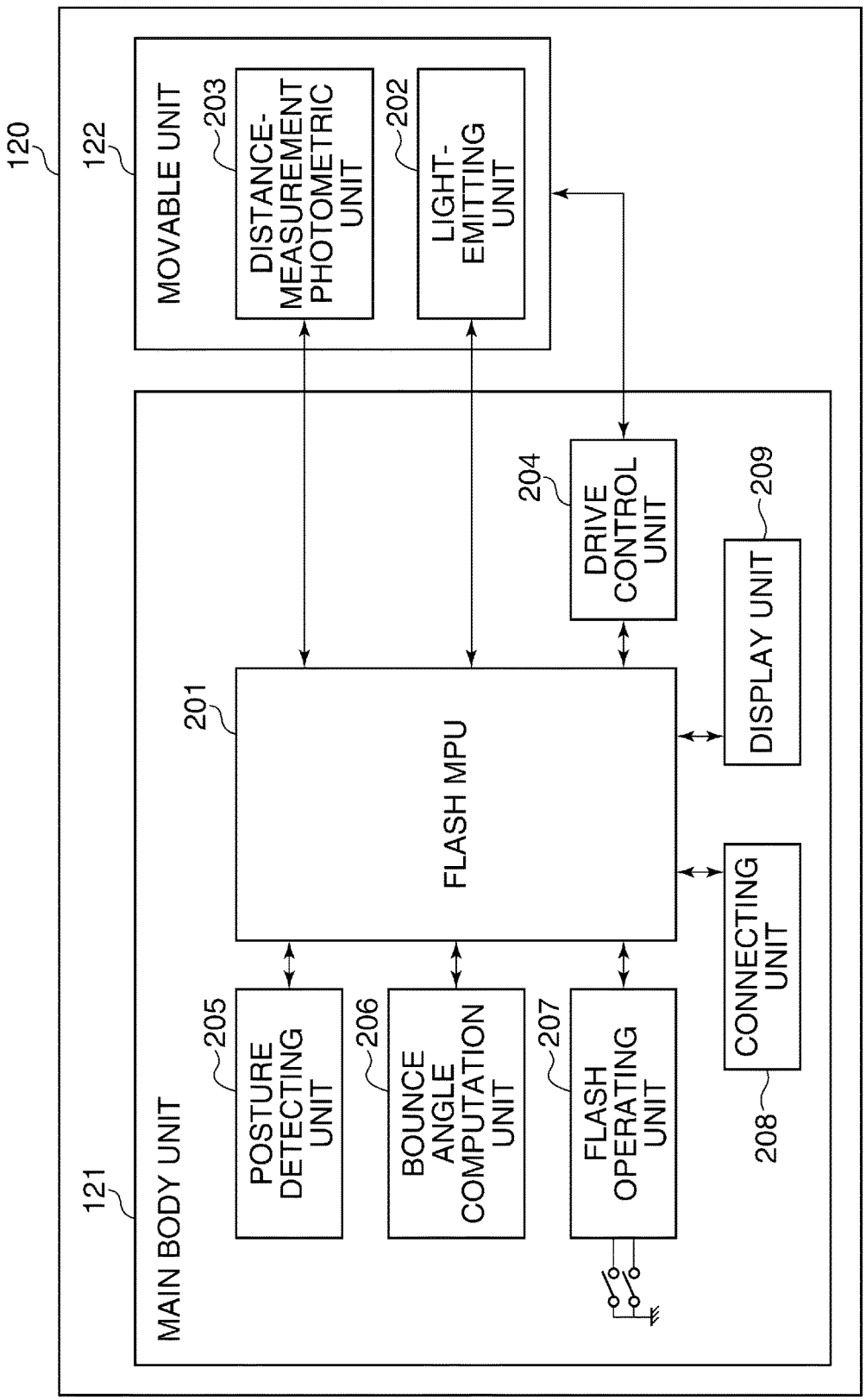
FIG. 4 is a block diagram schematically showing an arrangement of the external flash.

FIG. 3 is a rear view schematically showing an arrangement of the external flash 120. FIG. 4 is a block diagram schematically showing an arrangement of the external flash 120. The external flash 120 has a main body unit 121 (second body) which is removable from the image pickup apparatus 100, and the movable unit 122 (flash head unit: first body) which is supported so as to be able to turn in a vertical direction (angle of elevation) and a horizontal direction (angle of rotation) with respect to the main body unit 121. The movable unit 122 has a light-emitting unit 202 (light-emitter) and a distance-measurement photometric unit 203. The main body unit 122 has the flash MPU 201, a drive control unit 204, a posture detecting unit 205, a bounce angle computation unit 206, a flash operating unit 207, a connecting unit 208, and a display unit 209.

The flash MPU 201 is a microcontroller (microcomputer) that controls the overall operation of the external flash 120. The light-emitting unit 202 has a light source such as a flash discharge tube or an LED and an optical system formed of resin or the like and placed in front of the light source. The light-emitting unit 202 emits light from the light source in accordance with a light emission signal from the flash control unit 201 to radiate a flash in a predetermined direction. The distance-measurement photometric unit 203 has a light-receiving sensor having a light-receiving surface which points in the same direction as the radiating direction of a flash of light and outputs a signal corresponding to an amount of reflected light from an object radiated with the flash to the flash MPU 201. The flash MPU 201 calculates a distance from a radiating surface of the optical system of the light-emitting unit 202 to an object to be radiated based on the signal output from the distance-measurement photometric unit 203 that received a beam reflected from the object to be radiated when the light-emitting unit 202 emitted light.

The drive control unit 204 controls a motor, not shown, in accordance with signals from the flash MPU 201 to drive the movable unit 122 with respect to the main body unit 121 in two directions perpendicular to the shooting optical axis and perpendicular to each other. When the shooting optical axis is parallel to a horizontal direction, the two directions perpendicular to the shooting optical axis and perpendicular to each other are a vertical direction (up/down direction) and a horizontal direction (right/left direction). The drive control unit 204 also obtains angles of the movable unit 122 in the vertical direction and the horizontal direction with respect to the main body unit 121 and outputs the angles to the flash MPU 201. The posture detecting unit 205 detects a posture of the main body unit 121 (an inclination with respect to the horizontal direction, an angle of rotation about the shooting optical axis) by means of an acceleration sensor or the like and notifies the flash MPU 201 of the detected posture. The bounce angle computation unit 206 obtains the results of detection by the distance-measurement photometric unit 203 and the posture detecting unit 205 from the flash MPU 201 to calculate an optimal bounce angle and outputs the calculation result to the flash MPU 201.

The flash operating unit 207 is comprised of a button, a switch, a touch panel, and so forth for instructing the flash MPU 201 to cause the external flash 120 to perform various operations. As shown in FIG. 3, a bounce mode selector switch 401, a bounce angle setting switch 402, and a bounce angle clear switch 403, which constitute the flash operating unit 207, are provided on a rear surface of the main body unit 121. The bounce mode selector switch 401 is an operating means for switching between an AIB-F mode and an AIB-S mode. The AIB-F mode is a mode in which an optimal bounce angle is automatically decided, and the movable unit 122 is driven to the decided bounce angle (auto bounce full mode). The AIB-S mode is a mode in which the movable unit 122 is driven to a bounce angle set by the user (auto bounce semi mode). When the bounce angle setting switch 402 is turned on, the flash MPU 201 stores the present angle of the movable unit 122 as a set angle. When the bounce angle clear switch 403 is turned on, the present movable unit 122 is driven to a frontal position which is a default position. It should be noted that the frontal position is a position at which the light-emitting unit 202 points toward a subject, which is an object to be shot, and a central axis of the light-emitting unit 202 is substantially parallel to the shooting optical axis of the image pickup apparatus 100.

The connecting unit 208 is a part that enables the main body unit 121 to be mounted on and demounted from the image pickup apparatus 100 and has an electric contact or the like for enabling communication between the flash MPU 201 and the camera MPU 101. When the stop-down start button 302 is depressed in the image pickup apparatus 100 with the auto bounce mode set to the AIB-F mode, the camera MPU 101 provides notification of an auto bounce drive starting instruction to the flash MPU 201 via the connecting unit 208. In response to this notification, the flash MPU 201 performs a distance measurement and drives the movable unit 122 to an optimal angle. When the first switch SW1 of the shutter release button 301 is turned on with the auto bounce mode set to the AIB-F mode or AIB-S mode, the camera MPU 101 provides notification of an instruction to drive the movable unit 122 to the set angle to the flash MPU 201 of via the connecting unit 208. In response to this notification, the flash MPU 201 detects a difference between the set angle (target angle) and the present angle, and when there is a predetermined difference, the flash MPU 201 drives the movable unit 122 to the set angle. A state of the external flash 120, various settings, a setting menu, and so forth are displayed on the display unit 209. When there is the predetermined difference between the present angle and the set angle of the movable unit 122, the flash MPU 201 displays a warning on the display unit 209.

Figure 5A:
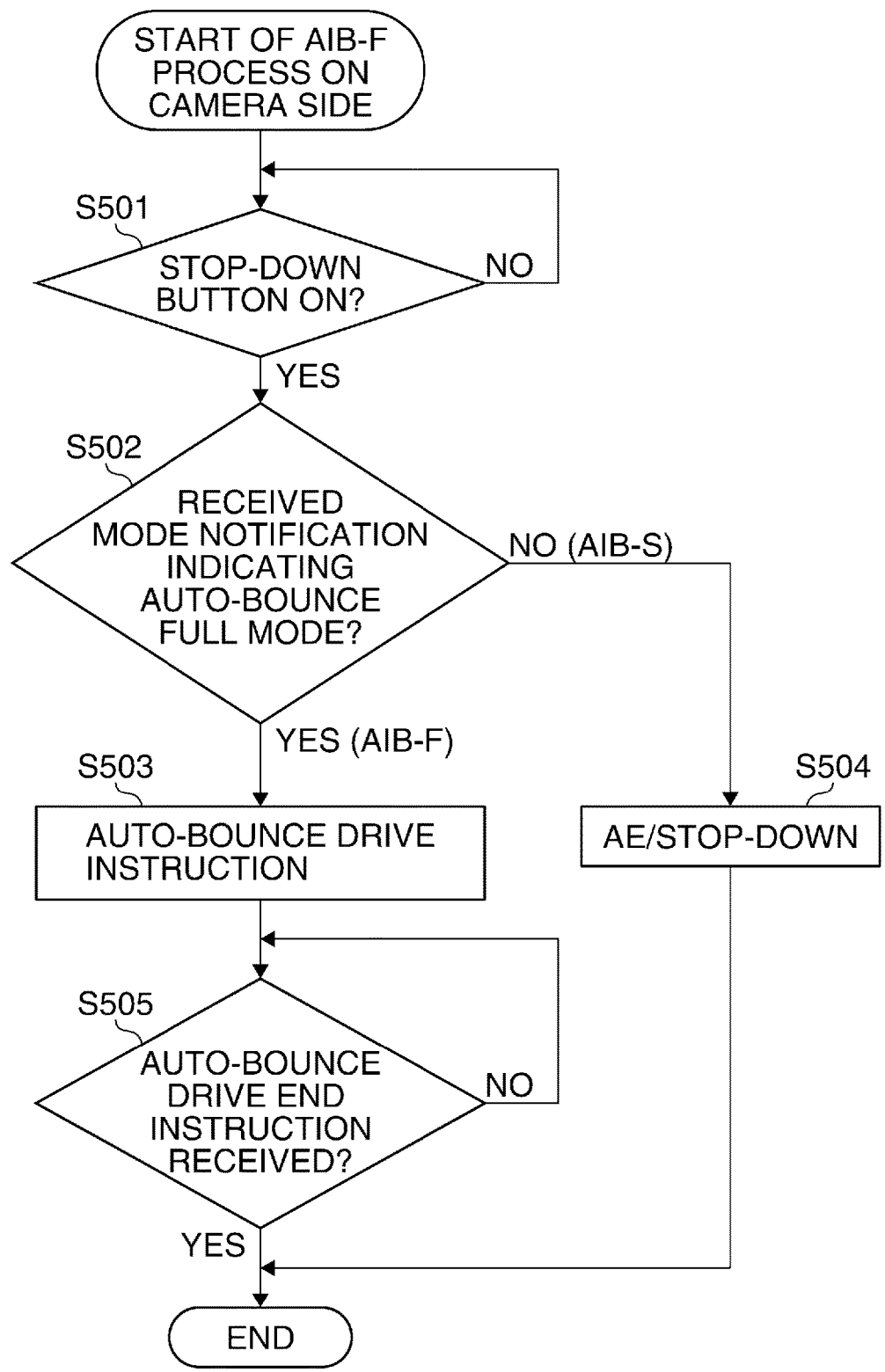
FIGS. 5A and 5B are flowcharts showing flash shooting control in the image pickup apparatus.

A description will now be given of how shooting is controlled in the image pickup apparatus 100. FIG. 5A is a flowchart showing how shooting with auto bounce is controlled in the image pickup apparatus 100 (the camera side). Processes indicated by reference symbols beginning with the letter S are implemented by the camera MPU 101 executing predetermined programs stored therein and controlling operation of the components of the image pickup apparatus 100 in response to instructions from the camera operating unit 117.

In S501, the camera MPU 101 determines whether or not the stop-down start button 302 included in the camera operating unit 117 has been depressed. Upon determining that the stop-down start button 302 has not been depressed (NO in S501), the camera MPU 101 repeatedly makes the determination in S501 and monitors a state of the stop-down start button 302. When the camera MPU 101 determines that the stop-down start button 302 has been depressed (YES in S501), the process proceeds to S502. In S502, the camera MPU 101 determines whether or not an auto bounce mode notification received from the flash MPU 201 indicates the AIB-F mode. It should be noted that the auto bounce mode notification indicates the AIB-F mode or the AIB-S mode. The auto bounce mode notification is provided from the flash MPU 201 to the camera MPU 101 through a process in S605, to be described later with reference to FIG. 6A. When the camera MPU 101 determines that it has received the auto bounce mode notification indicating the AIB-F mode (YES in S502), the process proceeds to S503.

In S503, the camera MPU 101 sends an auto bounce drive instruction to the flash MPU 201 via the flash control unit 118, and then the process proceeds to S505. In S505, the camera MPU 101 determines whether or not it has received an auto bounce drive end notification from the flash MPU 201. It should be noted that the auto bounce drive end notification is provided from the flash MPU 201 to the camera MPU 101 through a process in S613, to be described later with reference to FIG. 6A. Upon determining that it has not received the auto bounce drive end notification (NO in S505), the camera MPU 101 repeatedly makes the determination in S505 and stands by until it receives the auto bounce drive end notification. On the other hand, upon determining that it has received the auto bounce drive end notification (YES in S505), the camera MPU 101 ends the present process.

When the camera MPU 101 determines in S502 that it has received the auto bounce mode notification indicating the AIB-S mode (NO in S502), the process proceeds to S504. In S504, the camera MPU 101 causes the photometric unit 112 to perform photometry, calculates an exposure control values, and based on the calculated exposure control value (AV), causes the lens control unit 114 to run a lens diaphragm motor to adjust an aperture. After the process in S504, the camera MPU 101 ends the present process.

Figure 5B:
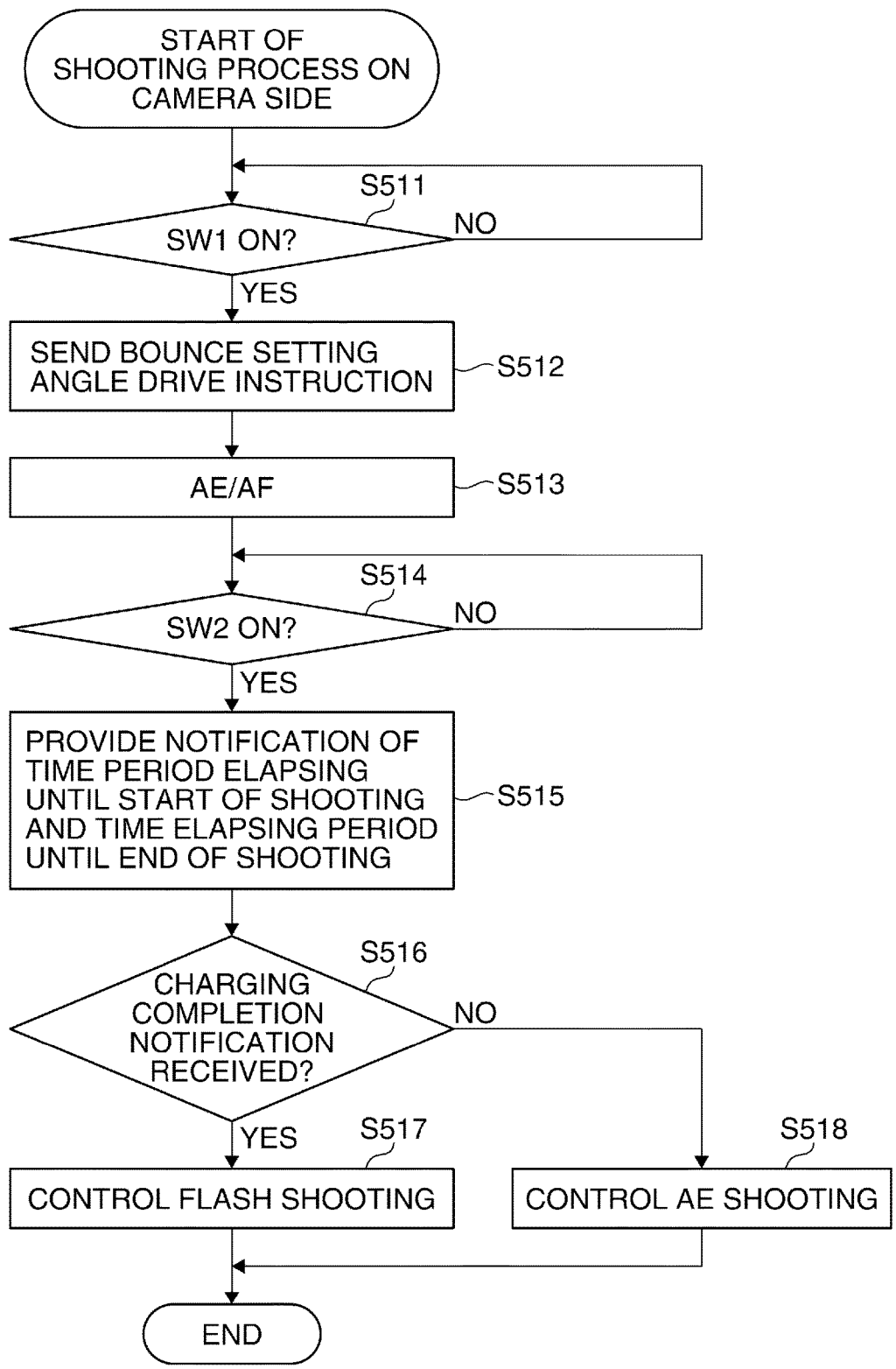

FIG. 5B is a flowchart showing a shooting process in the image pickup apparatus 100 (the camera side). Processes in the flowchart of FIG. 5B are implemented by the camera MPU 101 executing predetermined programs stored therein and controlling operation of the components of the image pickup apparatus 100 in response to instructions from the camera operating unit 117.

In S511, the camera MPU 101 determines whether or not the first switch SW1 of the shutter release button 301 has been turned on. Upon determining that the first switch SW1 has not been turned on (NO in S511), the camera MPU 101 repeatedly makes the determination in S511 and monitors a state of the shutter release button 301 until the first switch SW1 is turned on. When the camera MPU 101 determines that the first switch SW1 has been turned on (YES in S511), the process proceeds to S512.

In S512, the camera MPU 101 sends an instruction to drive the movable unit 122 to a bounce set angle to the flash MPU 201 via the flash control unit 118. In S513, the camera MPU 101 controls the lens control unit 114 to perform AF, and based on a result of photometry by the photometric unit 112, calculates an exposure control value. In S514, the camera MPU 101 determines whether or not the second switch SW2 has been turned on. Upon determining that the second switch SW2 has not been turned on (NO in S514), the camera MPU 101 repeatedly makes the determination in S514 and monitors a state of the shutter release button 301 until the second switch SW2 is turned on. When the camera MPU 101 determines that the second switch SW2 has been turned on (YES in S514), the process proceeds to S515.

In S515, the camera MPU 101 sends a time period Ts elapsing from turning-on of the second switch SW2 to start of shooting and a time period Te elapsing until end of shooting to the flash MPU 201 via the flash control unit 118. It should be noted that the time period Ts is a time period elapsing from when the second switch SW2 is turned on to when the shutter front curtain starts running. The time period Te is calculated according to the equation, Te=Ts+TV. In S516, the camera MPU 101 determines whether or not it has received a charging completion notification (notification that charging has been completed to such a level that light emission is possible) from the flash MPU 201. It should be noted that the camera MPU 101 receives the charging completion notification from the flash MPU 201 through a process in S619, to be described later with reference to FIG. 6B. Also, before receiving the charging completion notification from the flash MPU 201, the camera MPU 101 receives the charging incompletion notification (notification that charging has not been completed to such a level that light emission is possible) from the flash MPU 201 through a process in S615, to be described later with reference to FIG. 6B. When the camera MPU 101 determines that it has received the charging completion notification (YES in S516), the process proceeds to S517, and when the camera MPU 101 determines that it has not received the charging completion notification (NO in S516), the process proceeds to S518.

In S517, the camera MPU 101 controls light emission of the external flash 120 to perform flash shooting and then ends the present process. Specifically, the camera MPU 101 causes the flash control unit 118 to instruct the flash MPU 201 to fire a pre flash with a predetermined amount of light, and in accordance with the instruction, the flash MPU 201 fires a pre flash. Based on a luminance signal obtained when the pre flash was fired, the camera MPU 101 calculates an amount of light in main flash at the time of main shooting and causes the flash control unit 118 to instruct the flash MPU 201 to fire a main flash, and in accordance with the instruction, the flash MPU 201 fires a flash.

In S518, the camera MPU 101 performs an exposure operation with predetermined exposure control values in synchronization with the main flash, and after completing the exposure operation, displays image data on a shot image on the image display unit 107, stores the same in the storage medium 109, and ends the shooting operation. It should be noted that although in the flows of FIGS. 5A and 5B, the auto bounce drive control is triggered by turning-on of the stop-down start button 302 or the first switch SW1, what triggers the auto bounce drive control is not limited to this. For example, an auto bounce start switch may be provided in the camera operating unit 117 of the image pickup apparatus 100 or the flash operating unit 207 of the external flash 120, and the auto bounce drive control may be started in response to turning-on of the auto bounce start switch.

Figure 6A:
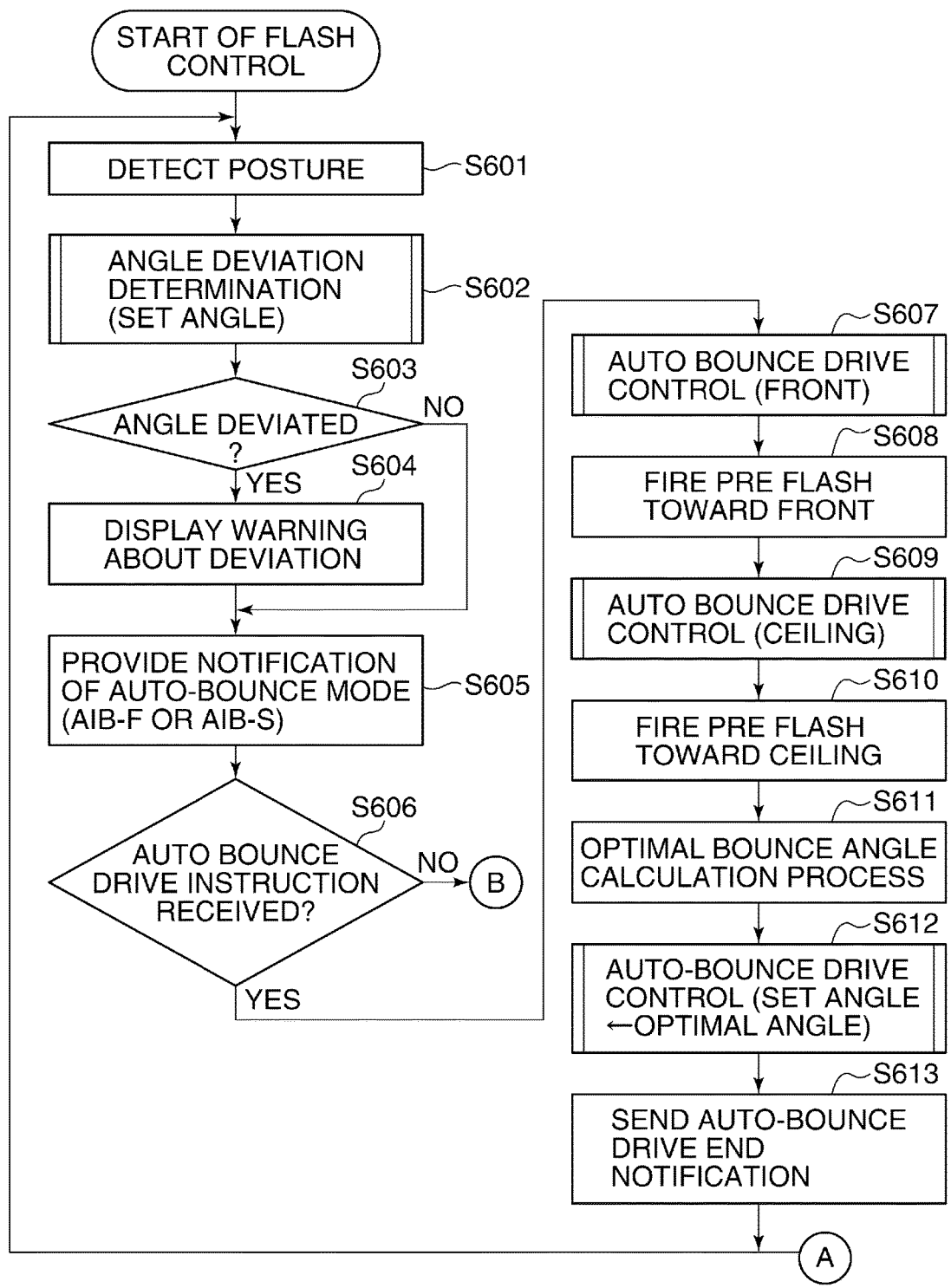
FIGS. 6A and 6B are flowcharts showing flash shooting control in the external flash.
Figure 6B:
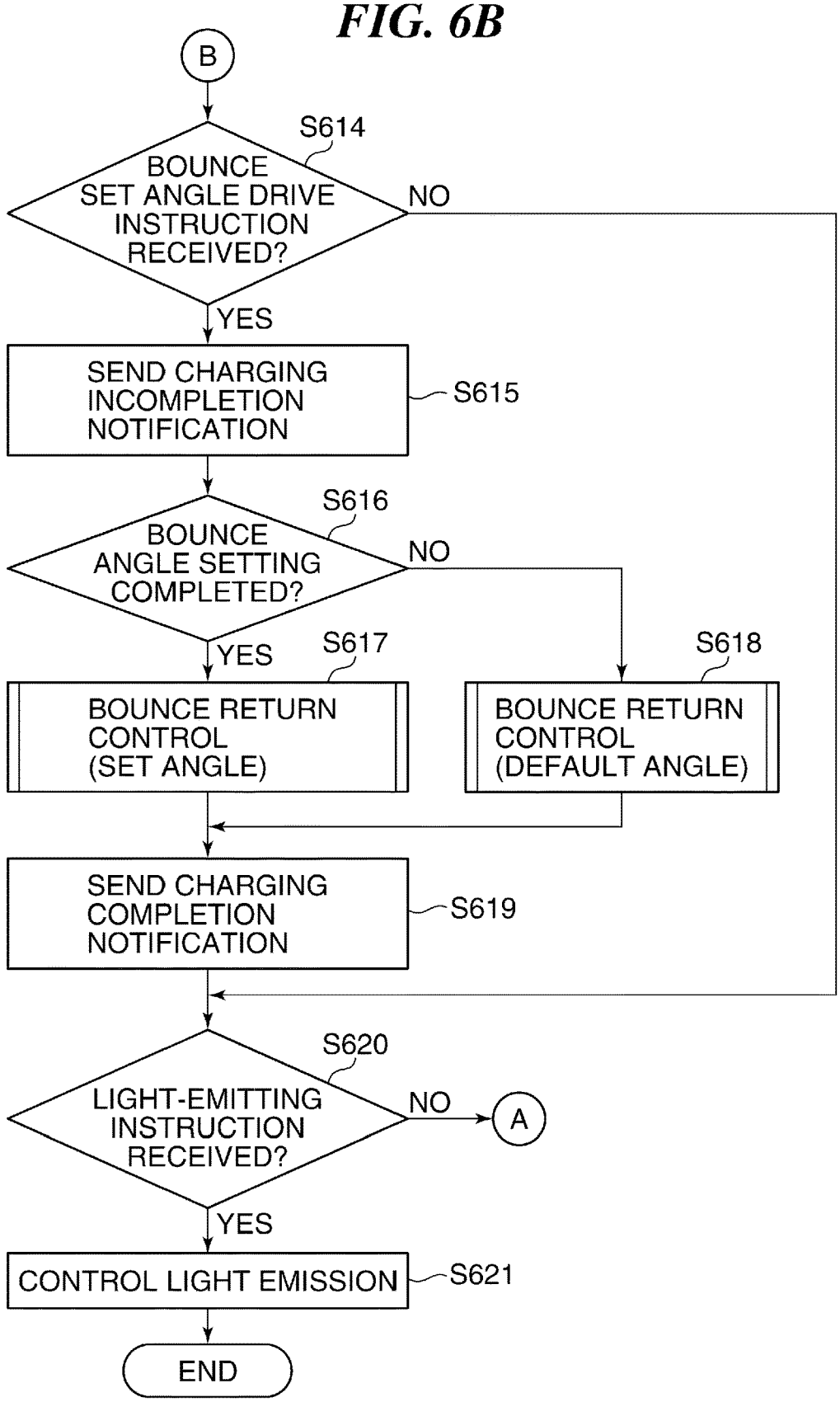

A description will now be given of control relating to flash shooting with the external flash 120. FIGS. 6A and 6B are flowcharts showing how flash shooting is controlled in the external flash 120. Processes indicated by reference symbols beginning with the letter S in the flowcharts of FIGS. 6A and 6B are implemented by the flash MPU 201 executing predetermined programs stored therein and controlling operation of the components of the image pickup apparatus 100 in response to instructions from the camera MPU 101 and instructions from the flash operating unit 207.

In S601, the flash MPU 201 obtains posture information on the main body unit 121 from the posture detecting unit 205. In S602, the flash MPU 201 carries out an angular deviation determination process. Generally, in the angular deviation determination process, present angles of the movable unit 122 in the horizontal direction and the vertical direction with respect to the main body unit 121 are obtained, and it is determined whether or not there is an angular deviation of the movable unit 122 with respect to set angles that are set in S612 and S712, to be described later. It should be noted that the angular deviation determination process will be described in detail later. In S603, based on a result of the determination in S602, the flash MPU 201 determines whether or not there is an angular deviation. When the flash MPU 201 determines that there is an angular deviation (YES in S603), the process proceeds to S604, and when the flash MPU 201 determines that there is no angular deviation (NO in S603), the process proceeds to S605. In S604, the flash MPU 201 displays, on the display unit 209, a warning that the angles of the movable unit 122 are deviated from the set angles as an annunciation process. It should be noted that the warning may be given by, for example, causing an LED lamp, not shown, to blink or light up. As another example of the annunciation process, the warning may be given by, causing a speaker, not shown, to produce a sound.

In S605, the flash MPU 201 notifies the camera MPU 101 of the auto bounce mode (the AIB-F mode or the AIB-S mode), which has been set by the bounce mode selector switch 401, via the connecting unit 208. In S606, the flash MPU 201 determines whether or not it received the auto bounce drive instruction from the camera MPU 101. It should be noted that the camera MPU 101 notifies the flash MPU 201 of the auto bounce drive instruction in S503. When the flash MPU 201 determines that it received the auto bounce drive instruction (YES in S603), the process proceeds to S607.

In S607, the flash MPU 201 performs auto bounce control to drive the movable unit 122 so that the light-emitting unit 202 can point toward the front (the central axis of the light-emitting unit 202 can be substantially parallel to the shooting optical axis). It should be noted that the direction toward the front corresponds to the direction of the optical axis, and therefore, the movable unit 122 is in such a posture as to be at an angle of zero degree)(° in each of the vertical and horizontal directions with respect to the main body unit 121. The process in S607 will be described in detail later. In S608, the flash MPU 201 fires a pre flash. Here, the direction of the pre flash corresponds to the direction toward the front (subject) as a result of the process in S607, and hence when a flash is emitted from the light-emitting unit 202 toward the subject, the distance-measurement photometric unit 203 detects reflected light from the subject and outputs a signal corresponding to an amount of the detected reflected light. The flash MPU 201 calculates a camera-to-subject distance based on the output signal obtained from the distance-measurement photometric unit 203.

In S609, the flash MPU 201 performs auto bounce control to drive the movable unit 122 so that the light-emitting unit 202 can point toward a ceiling. It should be noted that an angle at which the movable unit 122 is driven toward the ceiling is calculated based on an inclination of the main body unit 121. For example, assuming that the posture information on the main body unit 121 obtained in S601 indicates that the main body unit 121 is positioned at an angle of X degrees in the direction of gravity and at an angle of 0 degree in the direction of rotation about the optical axis, the movable unit 122 is driven at an angle of (90−X) degrees in the vertical direction and at an angle of 0 degree in the horizontal direction with respect to the main body unit 122. In S610, the flash MPU 201 fires a pre flash. Here, the direction of the pre flash corresponds to the direction toward the ceiling as a result of the process in S609, and hence when a flash is emitted from the light-emitting unit 202 toward the ceiling, the distance-measurement photometric unit 203 detects reflected light from the ceiling and outputs a signal corresponding to an amount of the detected reflected light. The flash MPU 201 calculates a distance from the light-emitting unit 202 to the ceiling (hereafter referred to as "the ceiling distance") based on the output signal obtained from the distance-measurement photometric unit 203. It should be noted that in the present embodiment, the movable unit 122 is driven toward the front and then driven toward the ceiling, but the movable unit 122 may be driven in the reverse order as long as the camera-to-subject distance and the ceiling distance can be calculated.

In S611, the flash MPU 201 calculates optimal bounce angles based on the camera-to-subject distance and the ceiling distance. A well-known technique can be used to calculate the optimal bounce angles with consideration given to the inclination angle of the main body unit 121, and therefore, details thereof is omitted here. In S612, the flash MPU 201 performs auto bounce control to drive the movable unit 122 to the optimal bounce angles and stores the optimal bounce angles as the respective set angles in the vertical and horizontal directions in a memory, not shown, of the flash MPU 201. On this occasion, when there are set angles that have already been stored in the memory, the stored set angles are overwritten (updated) with the optimal bounce angles calculated in S611. In S613, the flash MPU 201 sends an auto bounce drive end notification to the camera MPU 101 via the connecting unit 208, followed by the process returning to S601.

When the flash MPU 201 determines in S606 that it did not receive the auto bounce drive instruction (NO in S606), the process proceeds to S614. In S614, the flash MPU 201 determines whether or not it received the instruction to drive the movable unit 122 to the bounce set angles, which were from the camera MPU 101 to the flash MPU 201 in S512. When the flash MPU 201 determines that it received the drive instruction (YES in S614), the process proceeds to S615, and when the flash MPU 201 determines that it did not receive the drive instruction (NO in S614), the process proceeds to S620.

In S615, the flash MPU 201 sends a charging incompletion notification to the camera MPU 101 via the connecting unit 208. It should be noted that even if a capacitor, not shown, or the like of the external flash 120 has been completely charged (charged to such a level that light emission is possible), the flash MPU 201 sends the charging incompletion notification to the camera MPU 101 so as to disable flash shooting in S517. In S615, by turning off the LED lamp, not shown, the flash MPU 201 notifies the user that flash shooting is disabled.

In S616, the flash MPU 201 determines whether or not a bounce angle setting process has been completed. When the bounce angle setting process has been completed, this means that set bounce angles have already been stored in the memory of the flash MPU 201 although this will be described in detail later. When the flash MPU 201 determines that the bounce angle setting process has been completed (YES in S614), the process proceeds to S617, and when the flash MPU 201 determines that the bounce angle setting process has not been completed (NO in S616), the process proceeds to S618.

In S617, the flash MPU 201 performs bounce return control to drive the movable unit 122 so that the movable unit 122 can be positioned at the bounce angles stored in the bounce angle setting process, and then the process proceeds to S619. In S618, the flash MPU 201 performs the bounce return control to drive the movable unit 122 so that the light-emitting unit 202 can point toward the front so as to return to the default position, followed by the process proceeding to S619. In S619, the flash MPU 201 sends a charging completion notification to the camera MPU 101 via the connecting unit 208, and by turning on the LED lamp, not shown, the flash MPU 201 notifies the user that flash shooting is enabled.

In S620, the flash MPU 201 determines whether or not it received the light-emitting instruction (the instruction to fire a pre flash or a main flash, and the amount of light to be emitted), which was sent from the camera MPU 101 in S517. When the flash MPU 201 determines that it did not receive the light-emitting instruction (NO in S620), the process returns to S601, and when the flash MPU 201 determines that it received the light-emitting instruction (YES in S620), the process proceeds to S621. In S621, the flash MPU 201 controls light emission in accordance with the light-emitting instruction and then ends the present process.

Figure 7A:
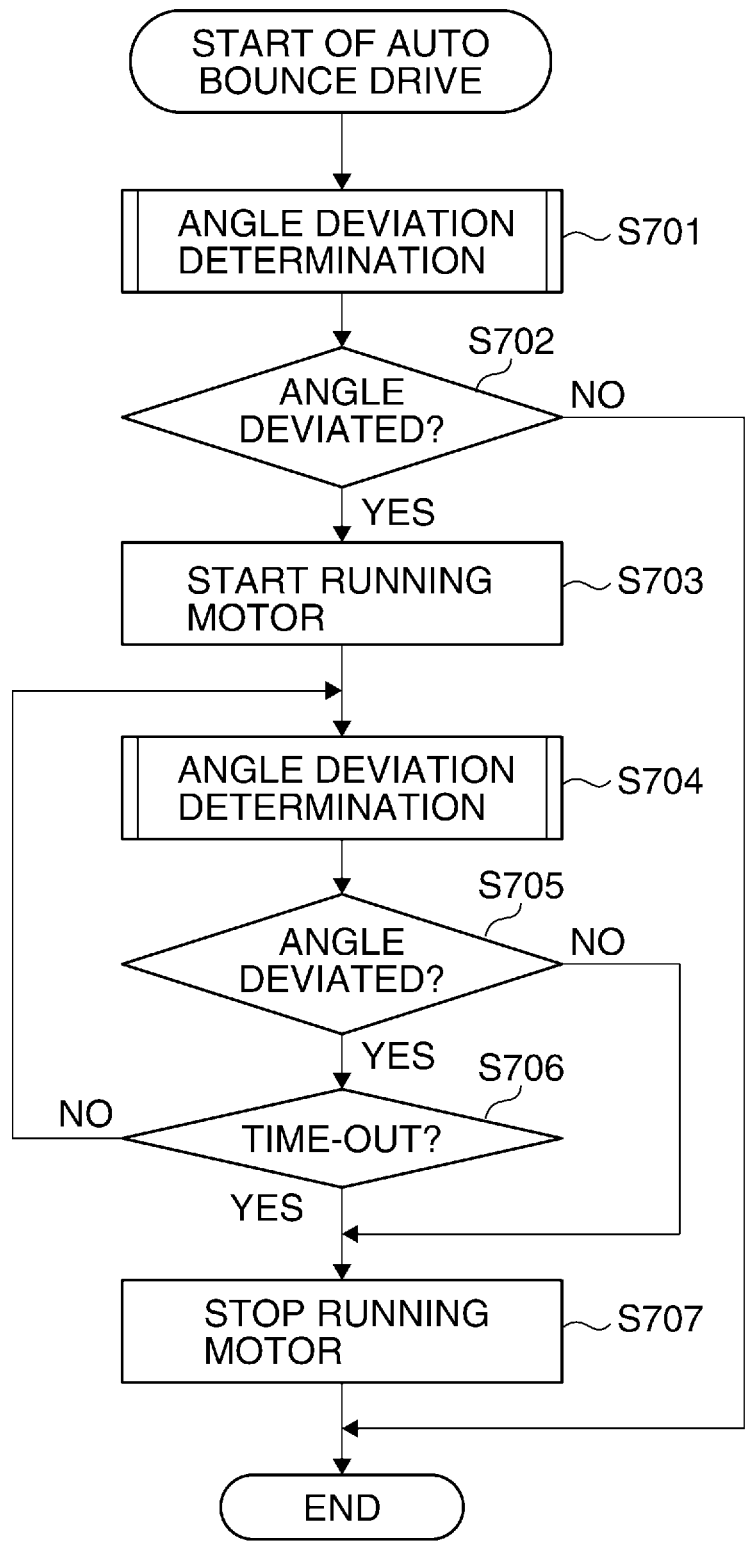
FIGS. 7A and 7B are flowcharts showing auto bounce drive control and bounce angle setting control in the external flash.
Figure 7B:
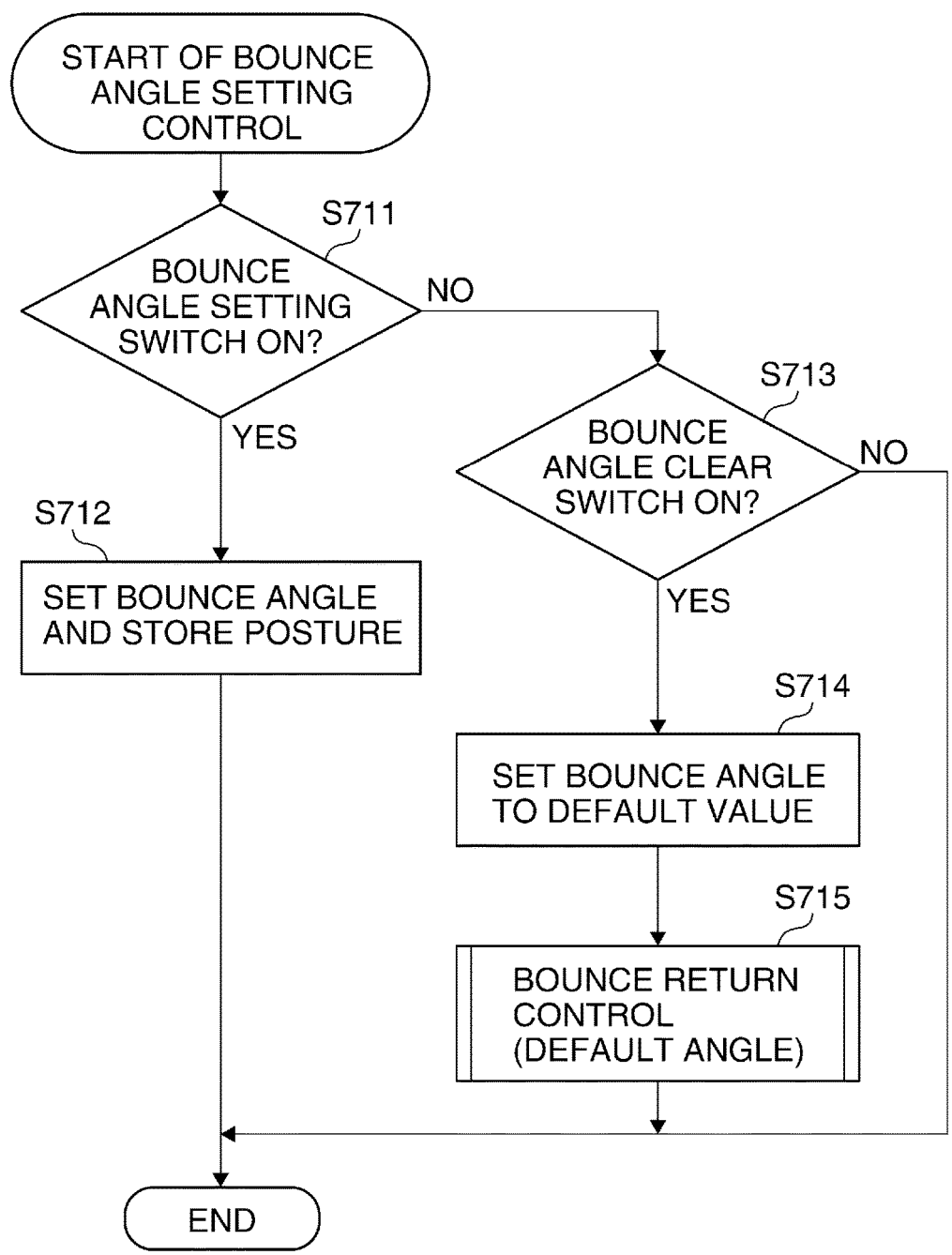

FIGS. 7A and 7B are flowcharts showing the auto bounce drive control (S607, S609, S612) for the movable unit 122. In S701, the flash MPU 201 carries out an angular deviation determination process. Generally, in the angular deviation determination process, the flash MPU 201 obtains present angles of the movable unit 122 in the horizontal direction and the vertical direction with respect to the main body unit 121 from the drive control unit 204 and compares the obtained angles with target angles in the horizontal direction and the vertical direction to which the movable unit 122 is to be driven in the horizontal direction and the vertical direction with respect to the main body unit 121. Here, the target angles mean the angles set in S607, S609, and S612. The angular deviation determination process will be described in detail later.

In S702, the flash MPU 201 determines whether or not there is a deviation between the present angles and the target angles as a result of the angular deviation determination process in S701. When the flash MPU 201 determines that there is an angular deviation (YES in S702), the process proceeds to S703, and when the flash MPU 201 determines that there is no angular deviation (NO in S702), the present process is ended. In S703, the flash MPU 201 starts driving the movable unit 122 by causing the drive control unit 204 to control operation of the motor, not shown.

In S704, the flash MPU 201 carries out an angular deviation determination process. This angular deviation determination process is the same as the angular deviation determination process in S701. Namely, the flash MPU 201 obtains present angles of the movable unit 122 in the horizontal direction and the vertical direction with respect to the main body unit 121 from the drive control unit 204 and compares the obtained angles with target angles in the horizontal direction and the vertical direction to which the movable unit 122 is to be driven in the horizontal direction and the vertical direction with respect to the main body unit 121. In S705, the flash MPU 201 determines whether or not there is a deviation between the present angles and the target angles as a result of the angular deviation determination process in S704. When the flash MPU 201 determines that there is an angular deviation (YES in S705), the process proceeds to S706, and when the flash MPU 201 determines that there is no angular deviation (NO in S705), the process proceeds to S707.

In S706, the flash MPU 201 determines whether or not a predetermined time period has passed since the motor started running (i.e. whether or not a timeout has occurred). When the flash MPU 201 determines that the timeout has not occurred (NO in S706), the process returns to S704, in which the flash MPU 201 in turn continues to run the motor, and when the flash MPU 201 determines that the timeout has occurred (YES in S706), the process proceeds to S707. In S707, the flash MPU 201 carries out a timeout error process in which it causes the drive control unit 204 to stop running the motor so as to stop movement of the movable unit 122, and after that, ends the present process.

FIG. 7B is a flowchart showing the bounce angle setting control (S616). In S711, the flash MPU 201 determines whether or not the bounce angle setting switch 402 is on. When the flash MPU 201 determines that the bounce angle setting switch 402 is on (YES in S711), the process proceeds to S712. In S712, the flash MPU 201 stores the present angles of the movable unit 122 in the horizontal direction and the vertical direction obtained from the drive control unit 204 as set angles in the horizontal direction and the vertical direction in the memory of the flash MPU 201, and then ends the present process. It should be noted that if there are set angles that have already been stored, they are overwritten with the new set angles. The set angles are calculated with consideration given to a posture (inclination angle) of the main body unit 121 although detailed description thereof is omitted.

When the flash MPU 201 determines that the bounce angle setting switch 402 is off (NO in S711), the process proceeds to S713. In S713, the flash MPU 201 determines whether or not the bounce angle clear switch 403 is on. Upon determining that the bounce angle clear switch 403 is off (NO in S713), the flash MPU 201 ends the present process. On the other hand, when the flash MPU 201 determines that the bounce angle clear switch 403 is on (YES in S713), the process proceeds to S714. In S714, the flash MPU 201 sets the set angles of the movable unit 122 in the horizontal direction and the vertical direction as default values. In S715, the flash MPU 201 performs bounce return control to drive the movable unit 122 so that the light-emitting unit 202 can point toward the front so as to return the movable unit 122 to the default position.

FIG. 8 is a flowchart showing the bounce return control (S617, S618, S715). In S801, the flash MPU 201 carries out an angular deviation determination process. In S801, the flash MPU 201 obtains present angles of the movable unit 122 in the horizontal direction and the vertical direction with respect to the main body unit 121 from the drive control unit 204 and compares the obtained angles with target angles in the horizontal direction and the vertical direction to which the movable unit 122 is to be driven in the horizontal direction and the vertical direction with respect to the main body unit 121. Here, the target angles mean the angles set in S617, S618, and S715.

In S802, the flash MPU 201 determines whether or not there is a deviation between the present angles and the target angles as a result of the angular deviation determination process in S801. When the flash MPU 201 determines that there is an angular deviation (YES in S802), the process proceeds to S803, and when the flash MPU 201 determines that there is no angular deviation (NO in S802), the present process is ended. In S803, the flash MPU 201 starts driving the movable unit 122 by causing the drive control unit 204 to control operation of the motor, not shown. In S804, the flash MPU 201 carries out an angular deviation determination process. This angular deviation determination process is the same as the angular deviation determination process in S801. Namely, the flash MPU 201 obtains present angles of the movable unit 122 in the horizontal direction and the vertical direction with respect to the main body unit 121 from the drive control unit 204 and compares the obtained angles with target angles in the horizontal direction and the vertical direction to which the movable unit 122 is to be driven in the horizontal direction and the vertical direction with respect to the main body unit 121.

In S805, the flash MPU 201 determines whether or not there is a deviation between the present angles and the target angles as a result of the angular deviation determination process in S804. When the flash MPU 201 determines that there is an angular deviation (YES in S805), the process proceeds to S806, and when the flash MPU 201 determines that there is no angular deviation (NO in S805), the process proceeds to S812. In S806, the flash MPU 201 determines whether or not it received the time period Ts elapsing from turning-on of the second switch SW2 to start of shooting and the time period Te elapsing until end of shooting, notification of which was provided from the camera MPU 101 in S515. When the flash MPU 201 determines that it received the time period Ts and the time period Te (YES in S806), the process returns to S807, and when the flash MPU 201 determines that it did not receive the time period Ts and the time period Te (NO in S806), the process proceeds to S811. It should be noted that the notification in S515 is provided in synchronization with turning-on of the second switch SW2. Then, in S806, the flash MPU 201 measures an elapsed time period Tp by starting a timer, which is for measuring a time period that has elapsed since turning-on of the second switch SW2, when receiving the time period Ts and the time period Te.

In S807, the flash MPU 201 calculates a remaining drive time period Tr for the movable unit 122 and determines whether or not the relationship, Ts<Tr<Te, holds. It should be noted that the remaining drive time period Tr is calculated by multiplying an angular deviation (remaining drive angle) at the time of the determination in S804 by a time period required to drive the movable unit 122 by one degree. When the flash MPU 201 determines that the relationship, Ts<Tr<Te, holds (YES in S807), the process returns to S808, and when the flash MPU 201 determines that the relationship, Ts<Tr<Te, does not hold (NO in S807), the process proceeds to S811.

In S808, the flash MPU 201 stops driving the movable unit 122 by causing the drive control unit 204 to control the motor, not shown. In S809, the flash MPU 201 determines whether or not the relationship, Tp>Te, holds between the elapsed time period Tp and the time period Te. Upon determining that the relationship, Tp>Te, holds (YES in S809), the flash MPU 201 clears the elapsed time period Tp and the time period Te to zero (Tp=0, Te=0) so as to prevent the process in S806 from being carried out again, followed by the process proceeding to S810. Upon determining that the relationship, Tp>Te, does not hold (NO in S809), the flash MPU 201 continues to make the determination in S809.

In S810, the flash MPU 201 resumes driving the movable unit 122 by causing the drive control unit 204 to control the motor, not shown. In S811, the flash MPU 201 determines whether or not a predetermined time period has passed since the motor started running (i.e. whether or not a timeout has occurred). When the flash MPU 201 determines that the timeout has not occurred (NO in S811), the process returns to S804, in which the flash MPU 201 in turn continues to run the motor, and when the flash MPU 201 determines that the timeout has occurred (YES in S811), the process proceeds to S812.

In S812, the flash MPU 201 carries out a timeout error process in which it causes the drive control unit 204 to stop running the motor so as to stop movement of the movable unit 122, and after that, ends the present process. This flow prevents the returning action of the movable unit 122 from ending during exposure (the time period Ts and the time period Te) and coming to a stop. This prevents the image pickup apparatus 100 from shaking in reaction to the stop of the movable unit 122 and thus prevents shooting from failing due to the shake.

FIG. 9 is a flowchart showing a first example of the angular deviation determination process (S602, S701, S704, S801, S804). In S901, the flash MPU 201 determines whether or not absolute values of the target angles by which the movable unit 122 should be moved (driven) in the horizontal direction and the vertical direction with respect to the main body unit 121 are smaller than $\alpha$ (for example, three degrees). Here, by determining whether or not the absolute values of the target angle are smaller than $\alpha$, it is determined whether or not the target angles are intended to point the movable unit 122 (the light-emitting unit 202) toward the front. The target angles mean the angles in the horizontal direction and the vertical direction, which are set in S612 and S712. The target angles are angles by which the movable unit 122 should be moved in S703 in the cases of S701 and S704, and are angles by which the movable unit 122 should be moved in S803 and S810 in the cases of S801 and S804. The value of $\alpha$ can be, for example, experimentally or empirically set to a value that would not substantially affect a shot image even if a radiating direction of a flash in shooting with bounce flash or the like is deviated from a target direction. When the flash MPU 201 determines that the absolute values of the target angles are smaller than $\alpha$ (YES in S901), the process proceeds to S902, and when the flash MPU 201 determines that the absolute values of the target angles are equal to or greater than $\alpha$ (NO in S901), the process proceeds to S904.

In S902, the flash MPU 201 obtains present angles of the movable unit 122 in the horizontal direction and the vertical direction with respect to the main body unit 121 from the drive control unit 204 and determines whether or not the absolute values of the present angles are smaller than $\alpha$. Here, by determining whether or not the absolute values of the present angles are smaller than $\alpha$, it is determined whether or not the movable unit 122 which should be moved toward front correctly points toward the front. When the flash MPU 201 determines that the absolute values of the present angles are smaller than $\alpha$ (YES in S902), the present process is ended, and when the flash MPU 201 determines that the absolute values of the present angles are equal to or greater than $\alpha$ (NO in S902), the process proceeds to S903. In S903, the flash MPU 201 determines that the present angles are deviated from the target angles, stores the present angles (or differences) in the memory of the flash MPU 201 so that they can be referred to in the subsequent processes, and then ends the present process.

In S904, the flash MPU 201 obtains present angles of the movable unit 122 in the horizontal direction and the vertical direction with respect to the main body unit 121 from the drive control unit 204 and determines whether or not absolute values of differences between the present angles and the target angles are smaller than $\beta$ (for example, 10 degrees). Namely, a sensitivity for determining that there is an angle deviation of the movable unit 122 varies between a case where the target angles are on the front and a case where the target angles are other than those on the front. Since $\beta$ is smaller than $\alpha$ here, a determination for pointing the movable unit 122 toward front more accurately is made when the target angles are on the front. On the other hand, for the target angles other than those on the front, a range where it is determined that there is no angular deviation is widened, and this prevents a warning from being frequently displayed and prevents the movable unit 122 from being frequently moved. When the flash MPU 201 determines that the absolute values of the present angles are smaller than $\beta$ (YES in S904), the present process is ended, and when the flash MPU 201 determines that the absolute values of the present angles are equal to or greater than $\beta$ (NO in S904), the process proceeds to S905. In S905, the flash MPU 201 determines that the present angles are deviated from the target angles, stores the present angles (or differences) in the memory of the flash MPU 201 so that they can be referred to in the subsequent processes, and then ends the present process.

According to the control method described above, when shooting is performed by direct firing with the movable unit 122 (the light-emitting unit 202) pointing toward the front, the amount of angular deviation is minimized, and this enables flash shooting that is appropriate from the viewpoint of a guide number and preventing deviation of distributed light. Moreover, the accuracy of distance measurement in S608 in which optimal bounce angles are calculated is increased. Furthermore, since the allowable amount of angular deviation is larger in shooting with bounce flash in which the movable unit 122 is not pointing toward the front than in the case where the movable unit 122 is pointing toward the front, frequent issuance of a warning caused by angular deviation and frequent bounce drive aiming at correcting for angular deviation are prevented. Setting the allowable amount of an angular deviation larger in shooting with bounce flash in which the movable unit is not pointing toward the front than in the case where the movable unit 122 is pointing toward the front means decreasing the sensitivity for determining that there is an angle deviation of the movable unit 122 in the case where the movable unit 122 is not pointing toward the front compared to the case where the movable unit 122 is pointing toward the front. Other methods for decreasing the sensitivity include decreasing a frequency of performing the angular deviation determination.

A description will now be given of another embodiment of the angular deviation determination process. FIG. 10 is a flowchart showing a second example of the angular deviation determination process (S602, S701, S704, S801, S804). In S1001, the flash MPU 201 calculates threshold values $\alpha$, $\beta$, and $\gamma$ for use in the angular deviation determination. Here, the threshold value $\alpha$ is for the front, the threshold value $\beta$ is for the ceiling, and the threshold value $\gamma$ is for the other directions. In the first example in FIG. 9, $\alpha$ and $\beta$ are fixed values, while in this example, the flash MPU 201 (or the camera MPU 101) sets $\alpha$, $\beta$, and $\gamma$ according to shooting conditions. Specifically, a light distribution angle (radiation angle) of the light-emitting unit 202 is narrow, unevenness of light distribution tends to occur even if the amount of angular deviation is small, and therefore, the threshold values are set to small values. For the same reason, when a focal length of the shooting optical system in the image pickup apparatus 100 is long, the threshold values are set to small values as well.

In S1002, the flash MPU 201 determines whether or not absolute values of the target angles by which the movable unit 122 should be moved (driven) in the horizontal direction and the vertical direction with respect to the main body unit 121 are smaller than $\alpha$. Here, by determining whether or not the absolute values of the target angles are smaller than $\alpha$, it is determined whether or not the target angles are intended to point the movable unit 122 (the light-emitting unit 202) toward the front. The target angles mean the angles in the horizontal direction and the vertical direction, which is set in S612 and S712. The target angles are angles by which the movable unit 122 should be moved in S703 in the cases of S701 and S704, and angles by which the movable unit 122 should be moved in S803 and S810 in the cases of S801 and S804. When the flash MPU 201 determines that the absolute values of the target angles are smaller than $\alpha$ (YES in S1002), the process proceeds to S1003, and when the flash MPU 201 determines that the absolute values of the target angles are equal to or greater than $\alpha$ (NO in S1002), the process proceeds to S1005.

In S1003, the flash MPU 201 obtains present angles of the movable unit 122 in the horizontal direction and the vertical direction with respect to the main body unit 121 from the drive control unit 204 and determines whether or not the absolute values of the present angles are smaller than $\alpha$. Here, by determining whether or not the absolute values of the present angles are smaller than $\alpha$, it is determined whether or not the movable unit 122 which is should be moved toward the front is correctly pointing toward the front. When the flash MPU 201 determines that the absolute values of the present angles are smaller than $\alpha$ (YES in S1003), the present process is ended, and when the flash MPU 201 determines that the absolute values of the present angle are equal to or greater than $\alpha$ (NO in S1003), the process proceeds to S1004. In S1004, the flash MPU 201 determines that the present angles are deviated from the target angles, stores the present angles (or differences) in the memory of the flash MPU 201 so that they can be referred to in the subsequent processes, and then ends the present process.

In S1005, the flash MPU 201 determines whether or not absolute values of differences between the target angle by which the movable unit 122 should be moved (driven) in the horizontal direction and the vertical direction with respect to the main body unit 121 and the ceiling angles are smaller than $\gamma$. Here, the ceiling angles mean amounts by which the movable unit 122 should be moved until it points toward the ceiling with consideration given to the posture of the image pickup unit 100. For example, when the movable unit 122 (the light-emitting unit 202) is pointing toward the front in the same direction as the shooting optical axis of the image pickup apparatus 100, the ceiling angles in the horizontal direction and the vertical direction are 0 degree and 90 degrees, respectively. Therefore, in S1005, by determining whether or not the absolute values of the differences between the target angles and the ceiling angles are smaller than $\gamma$, it is determined whether or not the target angles are intended to point the movable unit 122 (the light-emitting unit 202) toward the ceiling. When the flash MPU 201 determines that the absolute values of the differences between the target angles and the ceiling angles are smaller than $\gamma$ (YES in S1005), the process proceeds to S1006.

In S1006, the flash MPU 201 obtains present angles of the movable unit 122 in the horizontal direction and the vertical direction with respect to the main body unit 121 from the drive control unit 204 and determines whether or not absolute values of differences between the present angles and the ceiling angles are smaller than $\gamma$. Here, by determining whether or not the absolute values of the differences between the present angles and the ceiling angles are smaller than $\gamma$, it is determined whether or not the movable unit 122 (the light-emitting unit 202) which should be moved toward the ceiling is correctly pointing toward the ceiling. When the flash MPU 201 determines that the absolute values of the differences between the present angles and the ceiling angles are smaller than $\gamma$ (YES in S1006), the present process is ended, and when the flash MPU 201 determines that the absolute values of the differences between the present angles and the ceiling angles are equal to or greater than $\gamma$ (NO in S1006), the process proceeds to S1007. In S1007, the flash MPU 201 determines that the present angles are deviated from the target angles, stores the present angles (or differences) in the memory of the flash MPU 201 so that they can be referred to in the subsequent processes, and then ends the present process.

When the flash MPU 201 determines in S1005 that the absolute values of the differences between the target angles and the ceiling angles are equal to or greater than $\gamma$ (NO in S1005), the process proceeds to S1008. In S1008, the flash MPU 201 obtains present angles of the movable unit 122 in the horizontal direction and the vertical direction with respect to the main body unit 121 from the drive control unit 204 and determines whether or not absolute values of difference between the present angles and the target angles are smaller than β. For example, γ is set to a value smaller than β, and hence a determination for pointing the movable unit 122 toward the ceiling more correctly is made even when the target angles are in the ceiling direction. A pre flash is fired toward the ceiling for distance measurement so as to calculate optimal bounce angles in S610, and accordingly, it is preferred that the angles of the movable unit 122 are accurate so as to achieve high distance measurement accuracy. Therefore, as with the case where the movable unit 122 is pointed toward the front, the threshold value for determining whether or not there is an angular deviation is small as compared to other angles. When the flash MPU 201 determines that the absolute values of the differences between the present angles and the target angles are smaller than β (YES in S1008), the present process is ended, and when the flash MPU 201 determines that the absolute values of the differences between the present angles and the target angles are equal to or greater than β (NO in S1008), the process proceeds to S1009. In S1009, the flash MPU 201 determines that the present angles are deviated from the target angles, stores the present angles in the memory of the flash MPU 201 so that they can be referred to in the subsequent processes, and then ends the present process.

In the second example of the angular deviation determination process described above, whether or not there is an angular deviation is determined according to a direction in which the movable unit 122 should be pointed, a light distribution angle of the light-emitting unit 202, and a focal length of the shooting optical system. This improves the accuracy of distance measurement in S608 in which optimal bounce angles are calculated with respect to each of arrangements and shooting conditions of respective image pickup systems. Moreover, as compared to the first example described earlier, required accuracy is ensured in scenes where a radiating direction of a flash is required to be highly accurate, and the effect of preventing a warning from being displayed frequently due to angular deviations and preventing frequent bounce drive aiming at correcting for angular deviations can be more reliably achieved.

Figure 11:
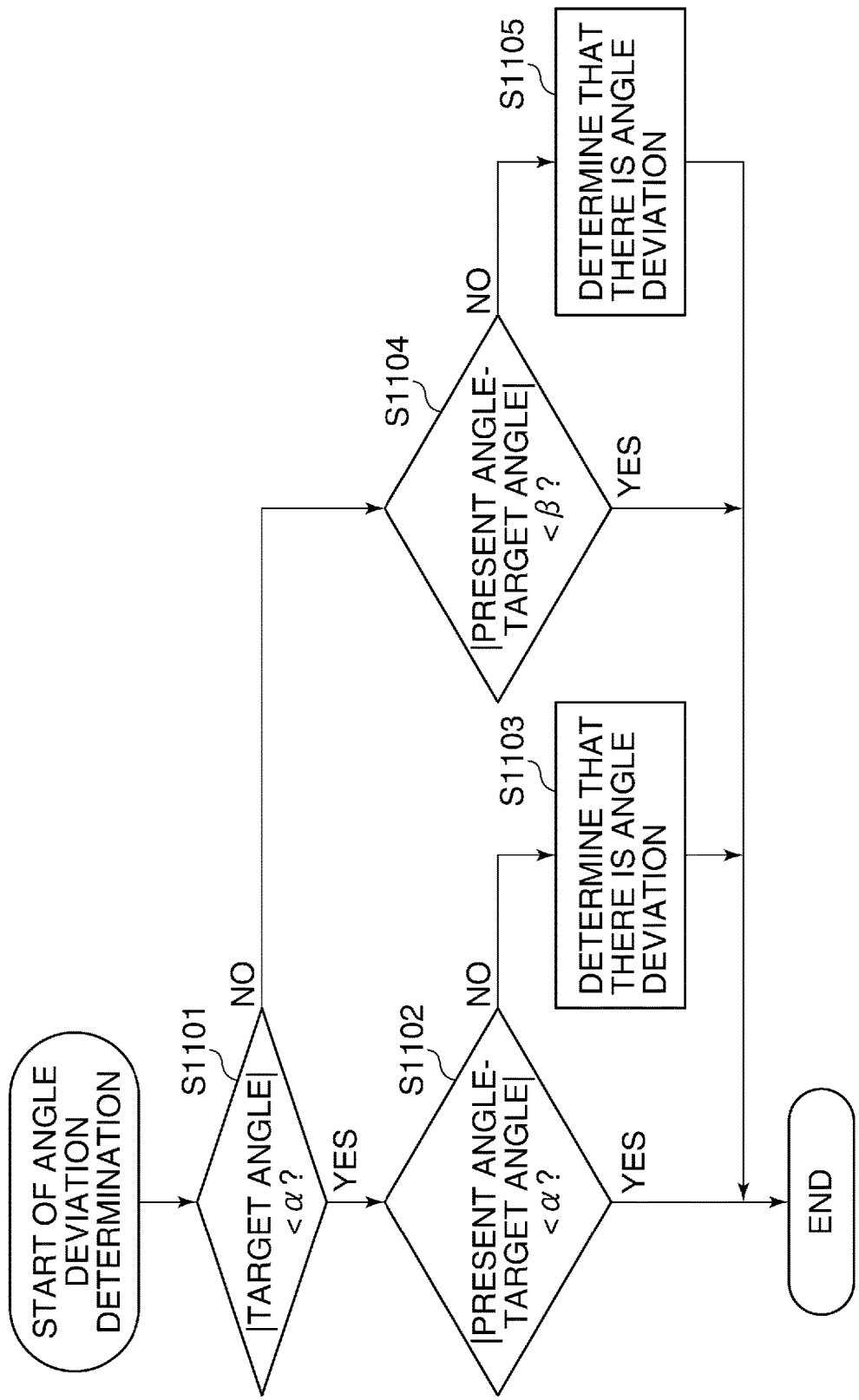
FIG. 11 is a flowchart showing a third example of the angular deviation determination process.

A description will now be given of still another embodiment of the angular deviation determination process. FIG. 11 is a flowchart showing a third example of the angular deviation determination process (S602, S701, S704, S801, S804). Detailed description of the same processes carried out in the third example as those carried out in the first example (FIG. 9) is omitted here by stating to that effect. The third example is characterized in that whether or not target angles are on the front is determined in S1101, and different threshold values are used in S1102 and S1104 according to determination results so as to determine whether or not there is an angular deviation.

The process in S1101 is the same as the process in S901, and therefore, description thereof is omitted. When the flash MPU 201 determines that absolute values of the target angles are equal to or greater than α (NO in S1101), the process proceeds to S1104. The processes in S1104 and S1105 are the same as the processes in S904 and S905, and therefore, description thereof is omitted. On the other hand, when the flash MPU 201 determines that the absolute values of the target angles are smaller than α (NO in S1101), the process proceeds to S1102.

In S1102, the flash MPU 201 obtains present angles of the movable unit 122 in the horizontal direction and the vertical direction with respect to the main body unit 121 from the drive control unit 204 and determines whether or not absolute values of differences between the present angles and the target angles are smaller than α. For example, in the determination in S902 in the first example, when the target angles are set to angles deviated only slightly from the front, it may be determined that there is an angular deviation even if the present angles are only slightly deviated from the target angles. For example, assuming that the target angles are set to two degrees which is slightly deviated from the front, and a is set to three degrees, it is determined that there is an angular deviation even if the present angles are deviated one degree from the target angles and become equal to three degrees. Conversely, it may be determined that there is no angular deviation even if the present angles are deviated α degrees or more from the target angles. For example, assuming that the target angles are set to two degrees, and a is set to three degrees as with the above example, it is determined that there is no angular deviation even if the present angles are deviated minus four degrees from the target angles and become equal to minus two degrees. To solve this problem, in S1102, not the absolute values of the present angles but the absolute values of the differences between the present angles and the target angles are found. This improves the accuracy of angular deviation determination when the movable unit 122 (the light-emitting unit 202) is driven to the target angles near the front, and therefore, the movable unit 122 is driven in a more stable manner.

When the flash MPU 201 determines that the absolute values of the differences between the present angles and the target angles are smaller than α (YES in S1102), the present process is ended, and when the flash MPU 201 determines that the absolute values of the differences between the present angles and the target angles are equal to or greater than α (NO in S1102), the process proceeds to S1103. The process in S1103 is the same as the process in S903, and therefore, description thereof is omitted.

Figure 12:
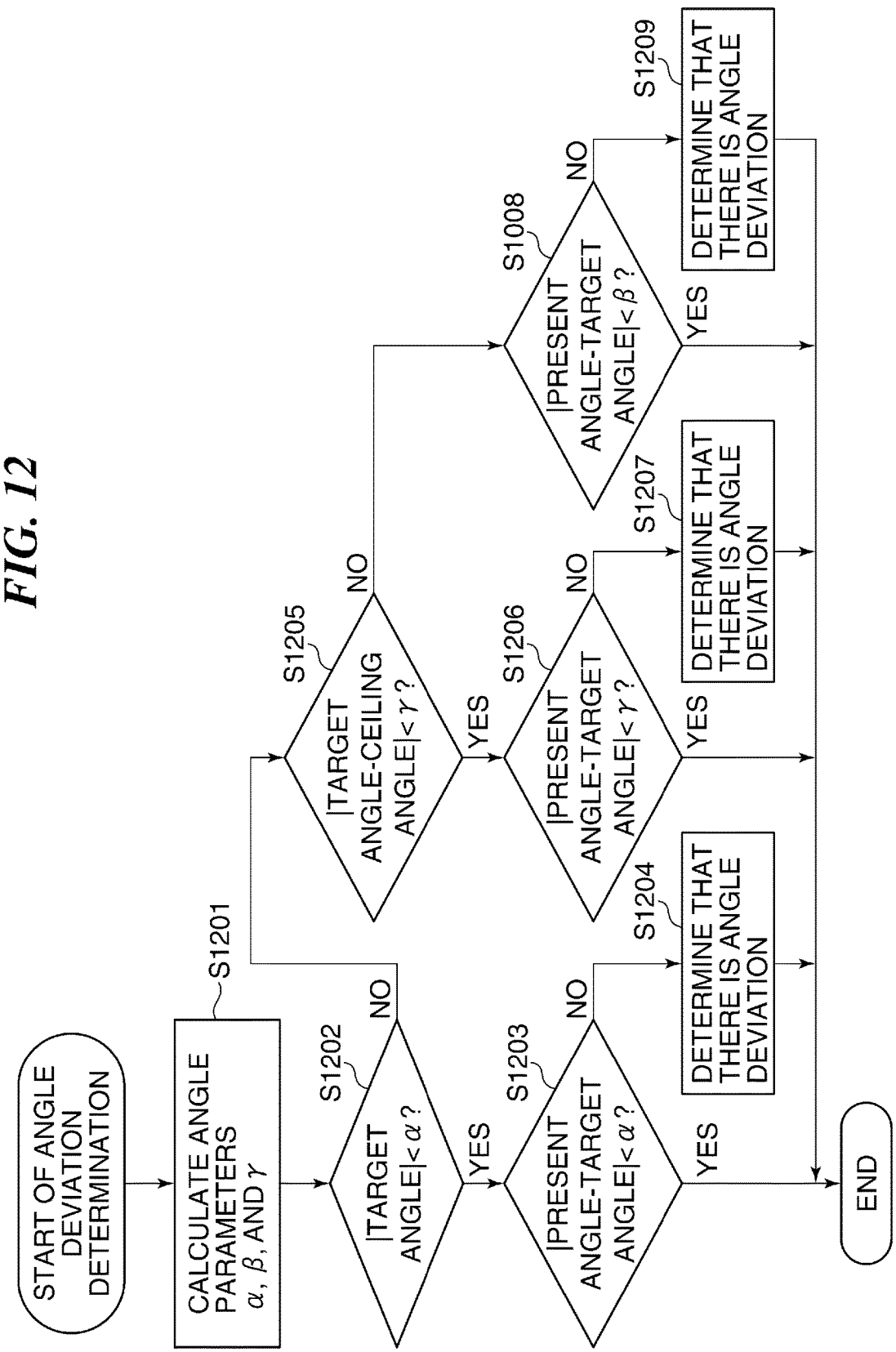
FIG. 12 is a flowchart showing a forth example of the angular deviation determination process.

FIG. 12 is a flowchart showing a fourth example of the angular deviation determination process (S602, S701, S704, S801, S804). Detailed description of the same processes carried out in the fourth example as those carried out in the second example (FIG. 10) is omitted here by stating to that effect. The fourth example is characterized in that whether or not target angles are on the front is determined in S1202, whether or not target angles are in the ceiling direction is determined in S1205, and different threshold values are used in S1203, S1206 and S1208 according to determination results so as to determine whether or not there is an angular deviation.

The processes in S1201 and S1202 are the same as the processes in S1001 and S1002, and therefore, description thereof is omitted. After the result of the determination in S1202 is positive (YES), the process proceeds to S1203, in which the flash MPU 201 in turn obtains present angles of the movable unit 122 in the horizontal direction and the vertical direction with respect to the main body unit 121 from the drive control unit 204 and determines whether or not the absolute values of differences between the present angles and the target angles are smaller than α. The reason for this is that when, for example, the target angles are set to angles slightly deviated from the front, it may be determined in S1003 in the second example that there is an angular deviation even if the present angles are only slightly deviated from the target angles. Conversely, it may be determined that there is no angular deviation even if the present angles are deviated a degrees or more from the target angle. To solve this problem, in S1203, not absolute values of the present angles but the absolute values of the differences between the present angles and the target angles are found. This improves the accuracy of angular deviation determination when the movable unit 122 (the light-emitting unit 202) is driven to the target angles near the front, and therefore, the movable unit 122 is driven in a more stable manner.

When the flash MPU 201 determines that the absolute values of the differences between the present angles and the target angles are smaller than α (YES in S1203), the present process is ended, and when the flash MPU 201 determines that the absolute values of the differences between the present angles and the target angles are equal to or greater than α (NO in S1203), the process proceeds to S1204. The process in S1204 is the same as the process in S1004, and therefore, description thereof is omitted.

The process in S1205 is the same as the process in S1005, and therefore, description thereof is omitted. After the result of the determination in S1205 is positive (YES), the process proceeds to S1206, in which the flash MPU 201 in turn obtains present angles of the movable unit 122 in the horizontal direction and the vertical direction with respect to the main body unit 121 from the drive control unit 204 and determines whether or not the absolute values of differences between the present angles and the target angles are smaller than γ. The reason for this is that when, for example, the target angles are set to angles slightly deviated from the ceiling, it may be determined in S1006 that there is an angular deviation even if the present angles are only slightly deviated from the target angles. Conversely, it may be determined that there is no angular deviation even if the present angles are deviated γ degrees or more from the target angles. To solve this problem, in S1206, not absolute values of differences between the present angles and the ceiling angles but the absolute values of the differences between the present angles and the target angles are found. This improves the accuracy of angular deviation determination when the movable unit 122 (the light-emitting unit 202) is driven to the target angle near the ceiling, and therefore, the movable unit 122 is driven in a more stable manner.

Although in the embodiment described above, movement of the movable unit 122 in the external flash 120 is controlled, the various types of control over the movable unit 122 described above may be applied to control over the built-in flash 119 as long as the built-in flash 119 has the same arrangement as that of the external flash 120. Moreover, although in the embodiment described above, the present invention is applied to the case where shooting is performed by firing a flash as illumination light, the present invention may also be applied to a case where shooting is performed by continuously emitting light for a predetermined time period.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091127, filed May 1, 2017 and Japanese Patent Application No. 2018-024240, filed Feb. 14, 2018, which are hereby incorporated by reference herein in their entirety.

What is claimed is:

1. An illumination apparatus including a first body that has a light-emitter and a second body that rotatably holds the first body in a predetermined direction, the illumination apparatus comprising:—
a memory configured to store programs; and
at least one processor configured to execute the programs stored in the memory to function as:
a determination unit configured to:
obtain a difference between a present angle of the first body with respect to the second body and a target angle to which the first body is to be moved; and
based on whether the obtained difference is smaller than a threshold value, determine whether there is an angular deviation of the first body,
wherein the threshold value used in the determination varies with the target angle.

2. The illumination apparatus according to claim 1, wherein the at least one processor is further configured to function as:
a decision unit configured to automatically decide a radiating direction in which illumination light is radiated from the light-emitter; and
a setting unit configured to set an angle of the first body with respect to the second body so as to radiate the illumination light in the decided radiating direction,
wherein the target angle is an angle of a movable unit with respect to the second body, which is set by the setting unit.

3. The illumination apparatus according to claim 1, wherein
a threshold value that is set when the target angle is an angle of the first body for pointing the light-emitter toward front is smaller than a threshold value that is set when the target angle is an angle of the first body for pointing the light-emitter in another direction other than the front, and
when the light-emitter points toward front, a central axis of the light-emitter is substantially parallel to a shooting optical axis of an image pickup apparatus on which the illumination apparatus is mounted.

4. The illumination apparatus according to claim 3, wherein the another direction is a direction toward a ceiling.

5. The illumination apparatus according to claim 1, wherein the narrower a radiation angle of illumination light radiated from the light-emitter, the smaller the threshold value.

6. The illumination apparatus according to claim 1, wherein the longer a focal length of a lens of an image pickup apparatus on which the illumination apparatus is mounted, the smaller the threshold value.

7. The illumination apparatus according to claim 1, wherein the target angle is set for each of two directions that are perpendicular to a shooting optical axis of an image pickup apparatus on which the illumination apparatus is mounted and are perpendicular to each other.

8. The illumination apparatus according to claim 1, wherein the at least one processor is further configured to function as a warning unit configured to give a warning when the determination unit determines that there is an angular deviation.

9. An illumination apparatus including a first body that has a light-emitter and a second body that rotatably holds the first body in a predetermined direction, the illumination apparatus comprising:
   a memory configured to store programs; and
   at least one processor configured to execute the programs stored in the memory to function as:
   a determination unit configured to, based on a difference between an angle of the first body with respect to the second body and a target angle to which the first body is to be moved, determine whether there is an angular deviation of the first body,
   wherein the determination unit is configured to differentiate a sensitivity for determining whether there is the angular deviation of the first body according to the target angle.

10. The illumination apparatus according to claim 9, wherein the determination unit is configured to determine whether there is the angular deviation of the first body based on a result of comparison between the difference and a threshold value.

11. The illumination apparatus according to claim 9, wherein the determination unit is configured to set a higher sensitivity in a case where a first angle is set as the target angle than in a case where a second angle, at which a central axis of the light-emitter is further away than the first angle from a shooting optical axis of an image pickup apparatus on which the illumination apparatus is mounted is set as the target angle.

12. The illumination apparatus according to claim 11, wherein
   the determination unit is configured to determine whether there is the angular deviation of the first body based on a result of comparison between the difference and a threshold value, and
   the threshold value is set to a smaller value in a case where the first angle is set as the target angle than in a case where the second angle is set as the target angle.

13. The illumination apparatus according to claim 12, wherein the at least one processor is further configured to function as an announcing unit configured to announce a result of determination by the determination unit.

14. A control method for an illumination apparatus including a first body that has a light-emitter and a second body that rotatably holds the first body in a predetermined direction, the method comprising:
   obtaining a difference between a present angle of the first body with respect to the second body and a target angle to which the first body is to be moved; and
   based on whether the obtained difference is smaller than a threshold value, determining whether there is an angular deviation of the first body,
   wherein the threshold value varies with the target angle.

* * * * *